United States Patent [19]
Griffin

[11] Patent Number: 5,893,077
[45] Date of Patent: *Apr. 6, 1999

[54] METHOD AND APPARATUS FOR GENERATING AND COLLECTING A BILLING EVENT OBJECT WITHIN AN ON-LINE NETWORK

[75] Inventor: William J. Griffin, Bothell, Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 518,534

[22] Filed: Aug. 23, 1995

[51] Int. Cl.[6] ....................................................... G06F 17/60
[52] U.S. Cl. ........................ 705/34; 705/30; 395/200.54; 707/103; 707/104
[58] Field of Search .................................... 395/202, 207, 395/208, 210, 211, 226, 227, 230, 232, 234, 601, 609, 610, 614, 184.01, 186, 187.01, 200.01, 200.02, 200.03, 200.06, 200.09, 683; 705/2, 7, 8, 10, 11, 26, 27, 30, 32, 34; 707/9, 10, 103, 104

[56] References Cited

U.S. PATENT DOCUMENTS

| | | | |
|---|---|---|---|
| 4,799,156 | 1/1989 | Shavit et al. ........................... | 395/226 |
| 4,827,508 | 5/1989 | Shear ...................................... | 380/4 |
| 5,347,632 | 9/1994 | Filepp et al. ....................... | 395/200.09 |
| 5,442,771 | 8/1995 | Filepp et al. ....................... | 395/200.09 |
| 5,500,855 | 3/1996 | Hershey et al. ....................... | 370/252 |
| 5,602,905 | 2/1997 | Mettke .................................. | 379/96 |
| 5,655,081 | 8/1997 | Bonnell et al. ..................... | 395/200.32 |
| 5,740,231 | 4/1998 | Cohn et al. ........................ | 395/200.54 |
| 5,768,521 | 6/1998 | Dedrick ............................... | 379/88.22 |

OTHER PUBLICATIONS

MFS Internals –Inside the Microsoft® Foundation Class Architecture; George Shepherd and Scot Wingo 1996; Chapter 1, pp. 1–27 and Chapter 5, pp. 151–199.

Dialog Abstract: File 16, Acc. ™03437663; "Minitel Service Company Announces PC Connect (TM)"; *News Release*; Aug. 2, 1991; p. 1.

*Primary Examiner*—Stephen R. Tkacs
*Attorney, Agent, or Firm*—Leydig, Voit & Mayer, Ltd.

[57] ABSTRACT

An event generation and collection system for a distributed network includes an event source which generates event objects and an event collector for gathering objects. Conversion routines are run on the event objects so that the data they carry can be converted to a format that is useful by other processes in the network.

42 Claims, 13 Drawing Sheets

BILLING SYSTEM OVERVIEW

STORE OBJECTS TO EVENT
OBJECT FILE

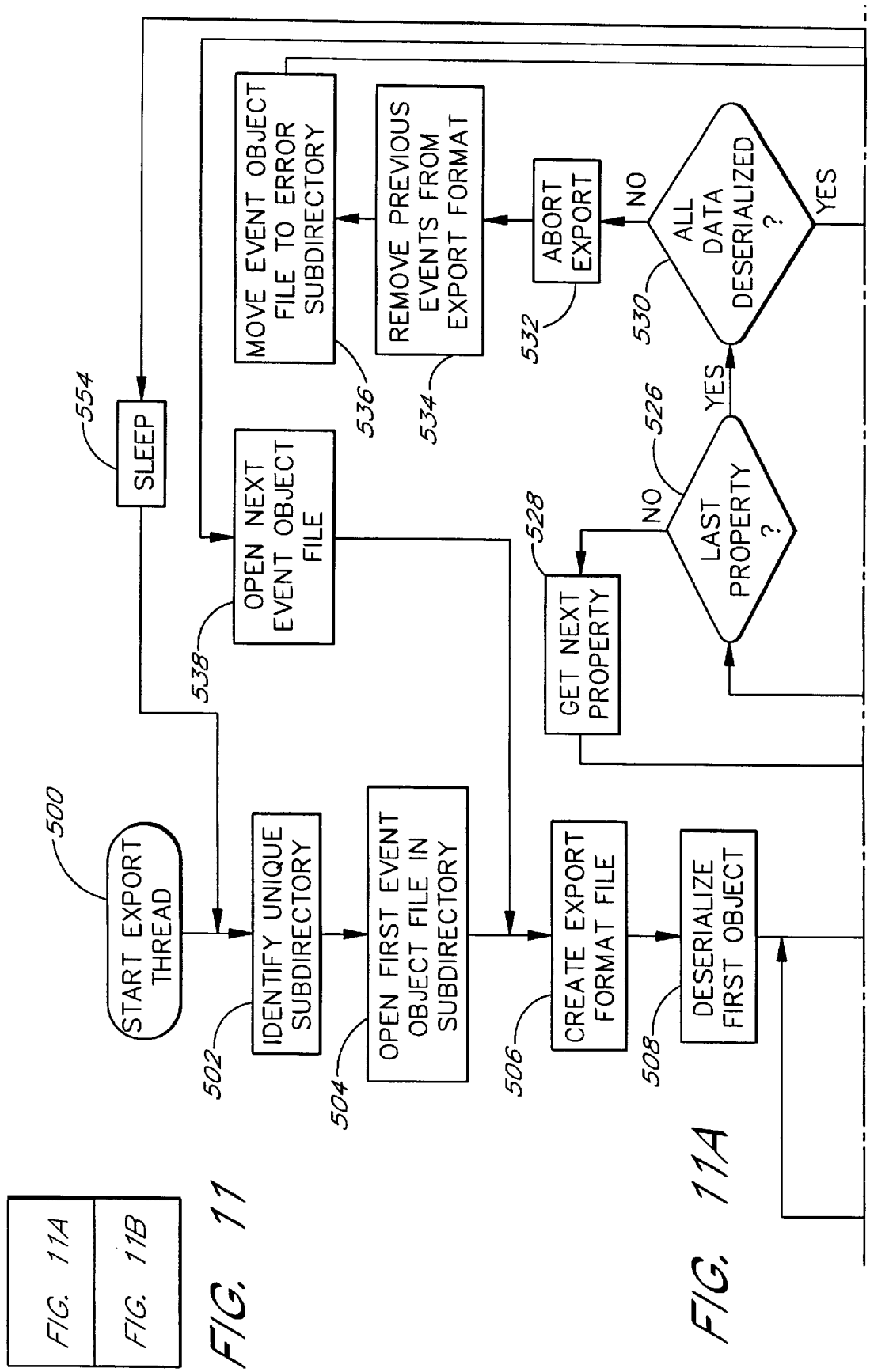

METHOD AND APPARATUS FOR GENERATING AND COLLECTING A BILLING EVENT OBJECT WITHIN AN ON-LINE NETWORK

BACKGROUND OF THE INVENTION

1. Field of the Invention

The present invention relates to event generation in a network system, and more specifically, relates to event generation in an on-line computer network.

2. Description of the Related Technology

Many different on-line networks are beginning to gain popularity with the general public. On-line networks such as Compuserve®, Prodigy®, America On-Line and the Microsoft® Network being accessed by increasing numbers of customers. In general, these networks offer news information, chat areas and email systems so that customers can communicate with each other.

On-line computer systems are becoming an integral part of many corporations' standard business practices. For example, a number of companies provide on-line technical support and information on their products and services. In addition, some companies now offer products and services which can be purchased electronically through computer systems such as the Internet. Naturally, the companies that support the networks must bill their customers for their services.

Generally, most businesses produce a bill at the end of every month that includes charges made during that month. These bills show an itemized breakdown of the charges for that month. Similarly, payment for products and services used on-line are normally either charged to the customer's credit card or billed to the customer. However, a statement detailing the charges is normally posted on-line, but not necessarily mailed to the customer. One of the challenges that has arisen from on-line purchasing is an accurate method of billing customers for their products and services.

One challenge of billing customers in an on-line network is the sheer volume of transactions that take place at any one time. Normally, customers are billed a standard monthly rate, and also charged for access to premium areas of the on-line network. In most cases, the on-line service provider charges a customer's credit card for the charges that have accrued in any month.

Customers can be billed for on-line charges that accrue while the customer is accessing the system. These charges accrue, for example, for every hour that the customer maintains a connection to an on-line network. A number of on-line systems such as Compuserve, America Online and the Internet can charge customers for every hour that they are connected to the network. In addition, these networks often offer services with "premium surcharges" which begin accruing when a customer accesses a specific area of the on-line network. For example, there may be an additional surcharge for accessing stock quotes or business news sections of the on-line network which is over and above the base subscription price the customer pays per hour to access the network. A formidable challenge in these on-line networks is the continuous update of billing information so that the charges can be viewed by the customer as they occur.

With potentially millions of users attaching to an on-line network, a billing system must be very efficient to properly charge the customer base while maintaining an up-to-date on-line statement of current charges. Some currently available on-line systems only update customer statements every twenty-four hours.

While complex billing systems for the UNIX operating system such as the Arbor Front-BP system from Kenan Technologies (Cambridge, Mass.) are available, they do not provide the sophistication necessary for billing millions of simultaneous on-line users in real time on a large network.

A system for interactive on-line electronic communications and processing of business transactions has been described in U.S. Pat. No. 4,799,156 to Shavit et al. Although a billing system for an on-line network is described in U.S. Pat. No. 4,799,156, it does not describe methods of tracking the progress of millions of simultaneous users and providing a real-time, on-line statement for each customer's account. Thus, a need exists for a sophisticated billing system in an on-line network that can track the progress of a customer during an interactive session and provide real-time statements.

SUMMARY OF THE INVENTION

The event generator provides an object-oriented method to identify and collect events in the Microsoft Network (MSN) which are of interest to further processing. For example, a "download" event object can be generated when the customer downloads a file from the MSN. Or a "close connection" event can be generated when a user logs off of MSN. Once the event object is generated, it is collected from the application server and imported into a database.

The database server parses the data depending on the type of event that has been generated. As an example the billing system can apply pricing rules according to the event type and stored information such as time of day. The marketing department may also want to access collected events for developing statistics on customers. The event generator architecture includes a class hierarchy which makes it easily extensible.

One embodiment of the present invention is a method of handling an event in an on-line network, comprising the steps of providing a class hierarchy of events wherein each defined event is indicative of customer access to the network; accessing the on-line network from a customer computer; generating an event object from the class for the customer access; repeating the prior two steps a plurality of times; and collecting the plurality of events in the on-line network into a storage.

Another embodiment of the present invention is an event generation system, including a plurality of computing devices connected together into a network; a plurality of event generators located in at least a portion of the computing devices, wherein events are generated which are indicative of an action in the network, and wherein each event generator stores events in a persistent storage; and an event collector connected to the network which periodically retrieves the stored events in each one of the event generators.

BRIEF DESCRIPTION OF THE DRAWINGS

FIG. 11, which comprises FIGS. 11A and 11B is a flow diagram of the convert event objects to export format file process of FIG. 5.

DETAILED DESCRIPTION OF THE PREFERRED EMBODIMENTS

Figure 1:
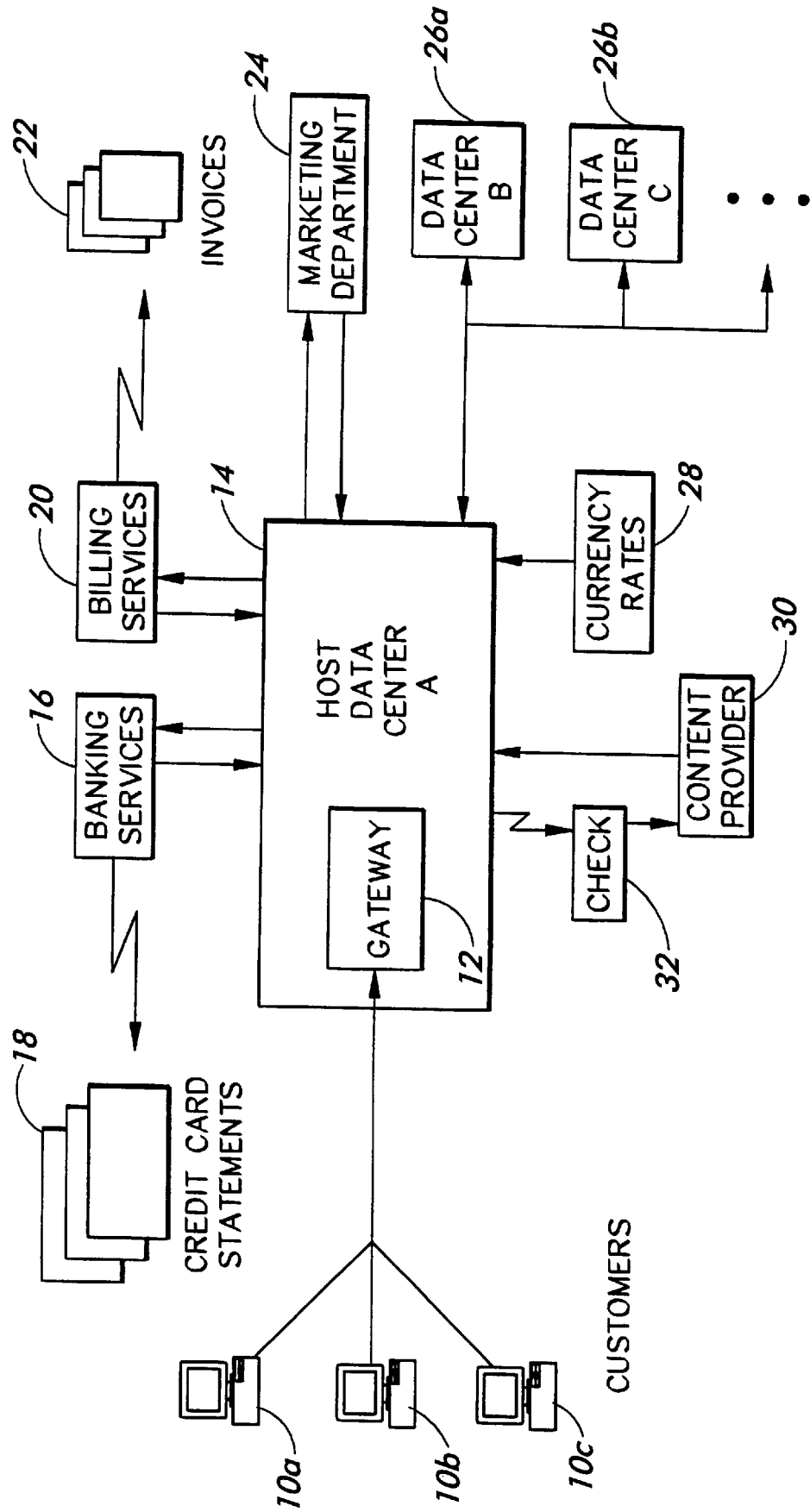
FIG. 1 is a block diagram showing an overview of the billing system which takes advantage of event generation of the present invention.

Reference is now made to the drawings wherein like numerals refer to like parts throughout. For convenience, the following description will be organized into the following five principle sections: Advantages of the Event Generation System, Event Generation System Overview, Event Object Structure, Billing System Overview and Conclusion.

I. ADVANTAGES OF THE EVENT GENERATION SYSTEM

The present invention is an event generation and collection system that can be used to collect data in a network system. Application events are generated by application programs running in a distributed network system. An application event is an object that is created in the network system to hold data relating to the event. For example, the date, time and event identification string may be held as data within an event object. One part of the distributed network can therefore create an event object that records a particular event in the system, and transport that data to another part of the network for processing.

Event objects can also be created and then advantageously copied to many different sites on the network. For example, an event object that is created when a customer closes a connection to the distributed network (i.e., signs off) can be generated at a gateway computer and then copied to a billing computer for tracking the customer's on-line usage and also sent to a marketing computer to track customer usage patterns. Because the event generation system is designed to preferably run under the Microsoft Windows NT operating system, error trapping can alert a system operator when any process does not complete accurately. As is known, the Windows NT operating system will generate Alert objects that will notify a system operator of any errors that have occurred within the system.

In the presently preferred embodiment of the invention, an application event is a C++ object derived from a class called CApplicationEvent. The CApplicationEvent class encapsulates the basic information that is common to all application events and is discussed in more detail below in reference to FIG. 4.

A "class" as discussed herein is a definition of a data type that specifies the representation of objects of the class and the set of operations that can be applied to the objects. An object of a class is a region of storage or memory. The notion of a "class" will be understood by those skilled in the object-oriented programming technology and, in particular, by those familiar with the "C++" programming language. Classes may be more fully comprehended by reference to *The Annotated C++ Reference Manual*, Ellis, Margaret and Stroustrup, Bjarne, Addison-Wesley Publishing Co., 1990.

The rationale for programmer-defined classes is that it provides data abstraction by allowing the representation details of objects to be hidden and accessed exclusively through a set of operations defined by the class. For example, putting a class in human terms, a "bakery class" would provide a mulberry pie sale operation to allow a customer to purchase a mulberry pie without any knowledge on the part of the customer as to how pies were stored at the bakery, or how the customer's pie was selected from a number of different pies.

The system of the present invention provides advantages over prior systems due to the efficiency of handling sets of event objects. When an event object is generated on a computer in the system, it is serialized into a binary-storable format and then appended to an event object file stored in the computer. Systems that are responsible for creating event objects and generating events are known as event generators. The event object file continues to grow in size as new event objects are appended. After a preset period of time has passed, a process on the system known as the event collector gathers the event object files. The event collector acts by polling linked computers to determine which computers have event object files. Once the event object files have been gathered by the event collector, the objects within each file are deserialized and objects are given to export threads which convert the object data into a text form. Once the data from each object has been placed into a text file, it can be imported into many different data manipulation programs such as spreadsheets, databases and word processors.

By saving event objects to files and then gathering the files at a central event collector, the system can efficiently gather data representing each event. Because of this increased efficiency, processes such as billing which rely on efficient event gathering can proceed in almost real-time. This is an advantage over previous systems wherein billing was delayed for hours or even days because of inefficiencies in gathering data relating to customer usage of the system.

Other systems, such as marketing, also benefit from the efficient handling of data by the event objects. Marketing departments rely on up-to-date information for making timely decisions. Since the system of the present invention can provide data on, for example, customer usage of a particular area on the system, the marketing department can respond rapidly to changes in customer habits or identify previously unknown needs. Similarly, the system operators can detect when particular areas of the distributed system are gaining popularity among customers and shift more resources to those areas. These and other advantages of this system will be more apparent from the following discussion.

II. EVENT GENERATION SYSTEM OVERVIEW

This section provides an overview of the event generation and collection system of the present invention. Referring now to FIG. 1, an overview of a distributed networking system which utilizes the event generation and collection system of the present invention is described. It will be understood that the present invention can be applied to other networks such as interactive television, ISDN, and so forth, and it shall not be restricted to on-line networks. In addition, while a billing system application is described herein as a framework for event generation the present invention has application in other fields.

A series of customers 10 are linked through a gateway 12 (shown in FIG. 2) to a host data center 14. In one embodiment, the host data center 14 is preferably a part of the Microsoft Network (MSN), however, other on-line distributed systems may be similarly configured.

The host data center 14 also communicates with several outside services. For example, the host data center 14 communicates with a banking services center 16 which produce credit card statements 18 to bill customers 10 for their services on-line. Several banking companies provide services for charging customers for on-line usage including NaBANCO and Checkfree. Both of these companies offer direct billing of customers for their on-line data services.

The host data center 14 also communicates with a billing services center 20 which can produce invoices 22. Billing service providers 20 can provide invoices 22 to customers who choose not to have their accounts linked to a credit card account. A corporation that sponsors its employees on the distributed network system may request to be billed for all charges incurred by the employees, for example.

The host data center 14 can interface with a marketing department computer 24 so that events that are generated at the host data center 14 can be used by the marketing department for gauging customers' interest in a particular area of the distributed network. For example, the marketing department may be interested in knowing how often customers access a particular area of the network and what is their purchasing profile (e.g., do they live in an upper income neighborhood as expressed by their zip codes). By communicating with the host data center 14, the marketing department can be provided with this type of information.

The host data center 14 can also communicate with remote data centers 26a,b so that events which occur on the remote data centers 26 can be communicated to the host data center for processing. Events that occur on the remote data centers 26 are saved to event object files. These files are then retrieved by the event collector within the host data center 14. Thus, the host data center 14 can track events which occur on remote data centers 26a,b throughout the distributed networking system. The remote data centers 26a,b may be located in the same country as the host data center 14 or different countries.

Since the customer 10 may be located in any country of the world, currency rates 28 are regularly stored in a file at the host data center 14 so that currency conversion can take place. For example, a customer 10 located in France might download a file from England that is priced in English pounds. To properly charge the French customer 10, the price for the downloaded file would need to be converted to French francs on the day of the file download. For this purpose, a currency conversion table is therefore regularly uploaded to the host data center 14 from any one of a number of known exchange rate providers.

Figure 2:
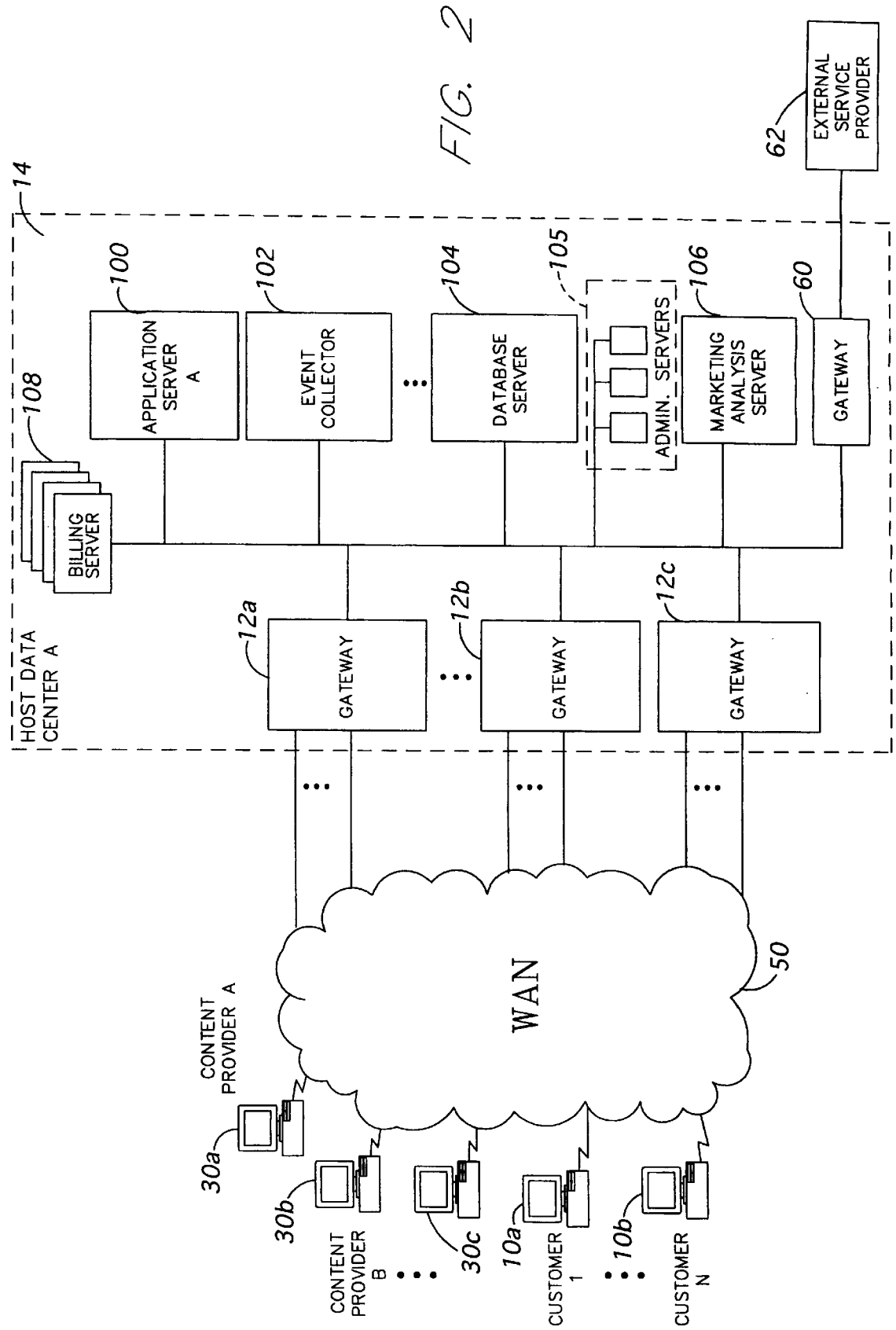
FIG. 2 is a block diagram of the host data center shown in FIG. 1.

A significant feature of the host data center is its interface with content providers 30 (FIG. 2). These content providers produce and distribute information to the host data center 14. One type of content provider might, for example, provide news clippings to the host data center. Another type of content provider 30 might provide real-time stock quotes to the host data center 14. In addition, content providers can provide services to customers attached to the host data center. One type of service, for example, could be a gateway to the Internet or other computer network.

Normally, content providers charge an additional fee for access to their services. The additional fee is normally charged by the owner of the host data center 14 through either the banking services 16 or billing services 20 interfaces. Thus, the owner of the host data center 14 collects money from the customers for the services provided by the content provider 30. The owner of the host data center 14 then reimburses the content provider 30 through a check 32 or electronic payment means to pay the content provider 30.

FIG. 2 provides a block diagram overview of the host data center and its associated connections. As shown, the customers 10a, 10b access gateways 12a, 12b, and 12c through a Wide Area Network 50 (WAN) as is well known in the technology. In addition, content 30a, 30b, and 30c also can access the host data center 14 through the same wide area network 50 and gateways 12a,b,c. Communication from the customers or content provider is preferably handled by the SRVDLL.DLL program interface.

The gateways 12a, 12b, and 12c is designed to handle communication protocols between numerous customers and the host data center 14. Customers can be connected to the gateway 12 through standard telephone lines using a modem, or directly linked through, for example, a TCP/IP connection as is well known in the technology.

The main function of the gateways 12a, 12b, and 12c is to allow a computer, such as one of the customer computers 10 to communicate with one network protocol with another computer located in the host data center 14 which has its own network protocol. The gateways 12a, 12b, and 12c also manages traffic from the host data center 14 to the customer 10. The gateways 12a, 12b, and 12c provide ready access to other networks such as the Internet. It should be understood that the present system is extensible so that multiple gateways can service the host data center 14 and the customers without departing from the spirit of the invention.

The host data center 14 includes multiple server computers, each one running an application specific task. An application server 100 is designed to run many of the programs requested through the gateway 12a, 12b, and 12c by the customer 10a and 10b. The application server 100 may run programs such as bulletin board services, file download systems, chat rooms, video on demand, and many other services.

Whenever an event, such as a file download, login, or logoff, occurs in this system, an event object is created. This process is described in detail below in reference to FIG. 7. Once an event object is created, it is stored locally in an event object file and then retrieved by an event collector 102. The event collector 102 can also gather event objects from application servers on remote data centers 26a,b (FIG. 1).

Once the event collector 102 has gathered event object files, they are typically communicated to another server, e.g., administration servers 105, marketing analysis server 106 a database server 104, or a billing server. The administration servers 105 are used to manage computer traffic within the host data center 14. The marketing analysis server 106 is used by the marketing department 24 to analyze data stored within the event objects that were gathered by the event collector 102.

In addition, the database server 104 can collect and analyze data stored within event objects. A billing server 108 gathers information form the event collector to provide real-time, on-line billing statements to the customer 10a and 10b. The process of collecting event objects and transmitting the data within them to other servers is described below in more detail. The structure of an event object is described in reference to FIG. 4.

Figure 3:
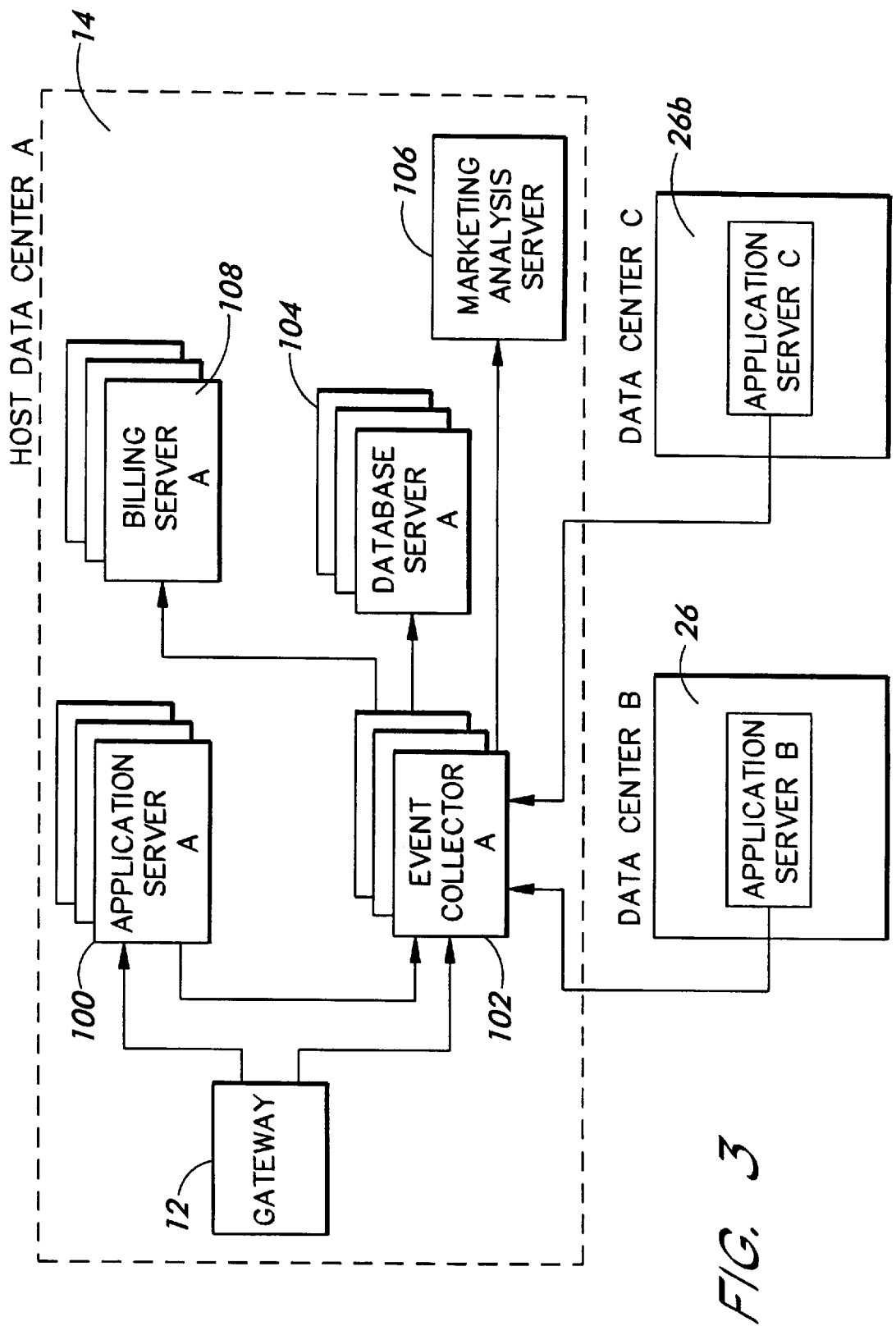
FIG. 3 is a block diagram of the host data center shown in FIG. 1 with connections to additional data centers.

FIG. 3 shows a detailed view of the flow of data between the gateway 12, application server 100, event collector 102, database server 104, billing server 108 and marketing analysis server 106. As is shown, data flows from the gateway 12 to the application server 100 as an interprocess communication pipe between these systems is opened.

Moreover, data flows from the gateway 12 to the event collector when event object files are copied from the gateway to the event collector. The events that are generated on the gateway 12 are usually related to a customer's interaction with the host data center 14. For example, a closed connection event or closed pipe event is usually generated by the gateway computer 12. These event objects are then transferred to the event collector 102.

Data can also flow from application servers located at remote data centers 26a, 26b to the event collector as shown in FIG. 3. As explained above, event objects are not usually moved from application servers to event collectors unless they are serialized into an event object file.

Figure 12:
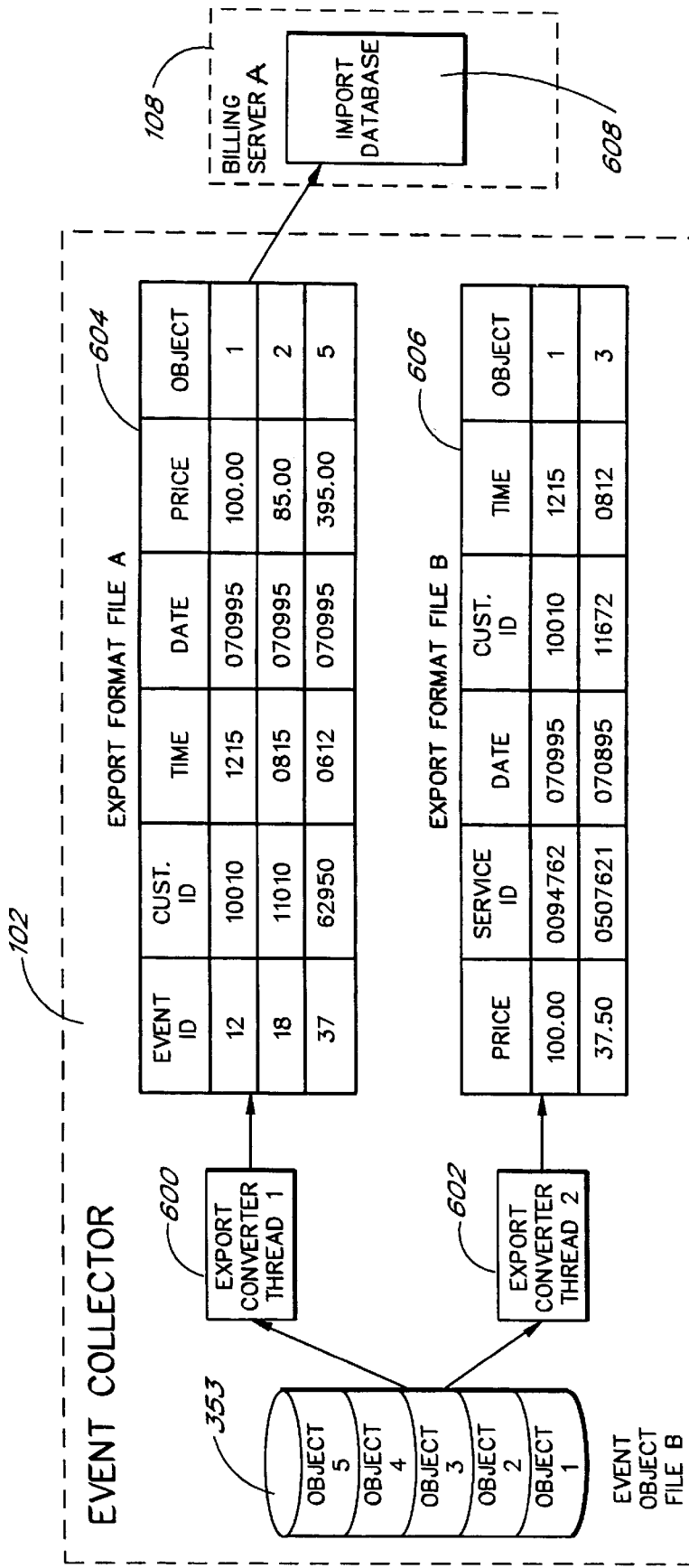
FIG. 12 is a block diagram detailing the process of exporting and converting event object files into export format files which are thereafter inserted into an import database.

Once event object files have been copied to the event collector 102, they are converted to many different export format files (see, e.g., 604, 606 at FIG. 12). An export format file is a file that contains the data within the object that is to be sent to other systems and services within the host data center 14. An example of an export format file is a tab-delimited text file. This type of text file can be easily imported into most databases and spreadsheet programs.

After the export format file has been created on the event collector, it is imported by either the marketing analysis server 106 or the database server 104. These servers use data from the event objects, such as Customer ID number and Event ID number, to produce bills or usage statements. The following section discusses the structure of the event objects and their class hierarchy.

III. EVENT OBJECT STRUCTURE

Figure 4:
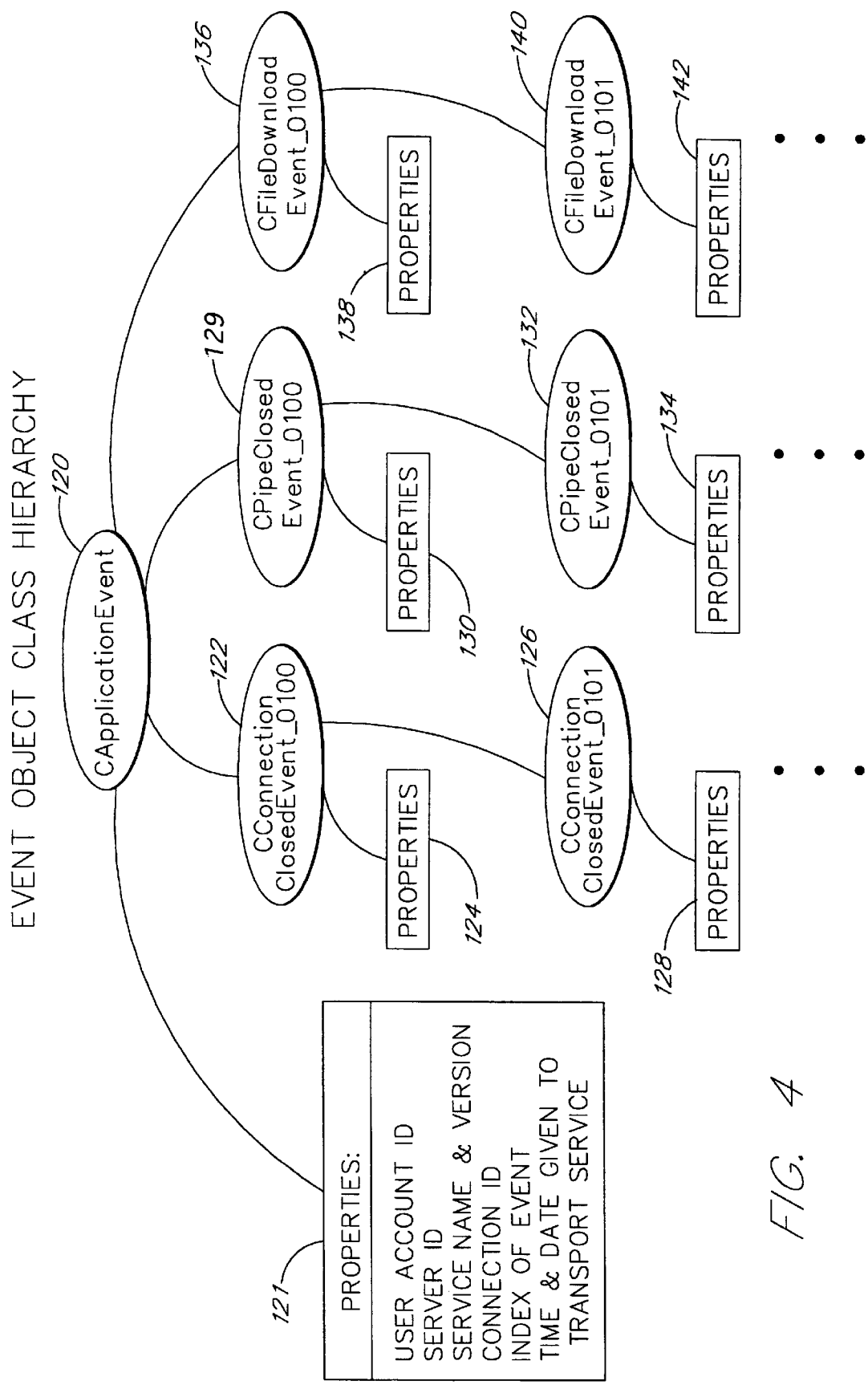
FIG. 4 is a diagram illustrating the C++ class hierarchy of event objects in the present invention.

Referring now to FIG. 4, the event object class hierarchy is shown. The parent class in this hierarchy is the CApplicationEvent 120. All other event object classes derive from the CApplicationEvent object. The associated properties 121 of the CApplicationEvent class 120 are shown below in Table 1.

For instance, the CConnectionClosedEvent class describes events that occur when a connection between the customer and the distributed networking system is broken. The CPipeClosedEvent class describes events that occur when an intercommunication process pipe between the customer and an application server is broken. This particular event may be generated a large number of times in a single on-line session.

Although these events describe different situations on the distributed network, they need to be treated generically by the operating system for functions like: storage, transmission, collection and export. The class CApplicationEvent was designed to accommodate generic handling of the various event classes. As discussed above, all application events derive from the CApplicationEvent parental class and each preferably exports a series of virtual functions that can perform the following operations:

1) Export all member variables into a multi-line, commented, human readable string.
2) Produce comma-separated output of member fields for export to Spreadsheets, Databases and Wordprocessors.
3) Produce SQL-formatted output of member fields of export to the Billing Database or other SQL database.
4) Serialize/Deserialize the object for transmission to another machine or for storage to some persistent medium.

By building the export format file definition (e.g. comma-separated, tab-delimited, fixed width) and Structured Query Language (SQL) output code into virtual functions of the objects, the code for serialization/deserialization is kept with the object structure itself. This allows a single thread in the operating system to act on any object by issuing a generic command to the object to serialize/deserialize. The object knows how to act upon itself, thereby reducing the system's housekeeping overhead. Any utilities that need to work with application events become easier to write and maintain because they can treat all events as a CApplicationEvent and use the virtual functions of the object to perform event-specific functions. Modifications can be made to the event objects without changing any code in the operating system and utilities that manipulate the objects.

TABLE 1

Properties of CApplicationEvent

| PROPERTY | VARIABLE | DESCRIPTION |
| --- | --- | --- |
| HACCT | m_haUserId | Unique Id of the User that was connected. |
| MOS_SERVER_ID | m_msidServerId | Unique Id of the Server that the Service was running on. |
| DynamicString | m_strServiceName | The name of the Service that generated the event. |
| SERVICE_VERSION | mn_sv | The version of the Service that generated the event. |
| DynamicBuffer | m_bufConnectionId | The first byte of the data is the size of the Connection Id. |
| DWORD | m_iEventLogged | Index of this event in this Server's event stream |
| FILETIME | m_ftLogged | Date/time that this event was logged. |

The properties illustrated in Table 1 are shared within all members of the class hierarchy shown in FIG. 4. Examples of application event classes as shown in FIG. 4 are: CConnectionClosedEvent, CPipeClosedEvent, and CFileDownloadEvent. Each class of application events is unique and describes completely different events that occur in the system.

Once an event occurs in the distributed network that runs the event generating and collecting system of the present invention, an event object is created which holds data relating to the event. The event object is normally produced on the same system where the event has occurred and thereafter stored to an event object file as described below.

Events occur whenever a preselected action occurs on the system. Normally, events are triggered by some action taken by the customer. For example, an event can occur when a customer first logs into a computer system. Additionally, events can occur when the customer logs out, downloads a file, accesses specific areas of the computer network or performs any other function that generates events as programmed by the system operator.

As shown, there are presently three subclasses of the CApplicationEvent class 120. However, it can be recognized that many other objects can be added to this hierarchy as the event generation system is designed to be extensible. Each of these three classes, as described below, can have many different versions. As illustrated in FIG. 4, the CConnectionClosedEvent_0100 122 has associated properties 124. CConnectionClosedEvent_0101 126, another version of the event, with associated properties 128 is also illustrated in FIG. 4. As is known in the standard C++ class hierarchy scheme, the CConnectionClosedEvent_0101 objects will not only contain properties 128, but will also inherit all of the properties 124 of its parent. The CConnection Closed Event object is created when a user logs off the system, therefore terminating the connection from the customer 10 to the gateway 12 (FIG. 1).

The second subclass of CApplicationEvent 120 is the CPipeClosedEvent_0100 class 129 with associated properties 130. The CPipeClosedEvent object is produced when the connection between the server 12 and application server 100 is disrupted. It should be noted that during a normal on-line session, multiple pipes from the gateway 12 to the application server 100 may be in simultaneous use by the customer at any time. Thus, generating a CPipeClosedEvent 128 does not indicate that the customer 10 has logged off the system. Rather, it simply indicates that the customer has closed an interprocess communication pipe to a particular application on the application server. As is shown in FIG. 4, the CPipeClosedEvent class 129 has a subclass 132 which has its own associated properties 134.

The third class of objects within the CApplicationEvent class 120 is the CFileDownloadEvent_0100 class 136 which has associated properties 138. A CFileDownloadEvent object 136 is created when a customer downloads a file from the application server 100. An additional version of the CFileDownloadEvent 140 is also shown with its associated properties 142.

Although only three subclasses of the CApplicationEvent class 120 are illustrated in FIG. 4, it should be recognized that many subclasses of CApplicationEvent can be added to the system so that desired events can be generated. The following example shows how to derive a new application event class from the parental CApplicationEvent class. The class CFileDownloadEvent will be used as an example.

Add the New Class to BILLEVNT.H

In the header file, BILLEVNT.H, add the new Application Event derived from CApplicationEvent. The following virtual functions should be implemented and override the functions in the base class:

Sdid—Returns a unique serialized data type ID for this C++ class.

Sdver—Returns the version of this C++ class within it's respective serialized data type.

FDisplay—Display all member variables in a formatted string.

FCsfVariableTitles—Store variable name titles to a string in a comma delimited format.

FToCsfString—Store member variables to a string in comma delimited format.

FToSQLString—Store member variables to a string in a SQL import format.

FSerializeClass—Serialize/Deserialize member variables to/from a binary format.

Any additional member variables that will be required to store information about the new application event are then added to the derived class. Further, the Get/Set type functions for accessing the variables should be included in the class. Using the Get/Set C++ functions allows the objects to maintain control over their own properties. The Get/Set functions are public interfaces to the objects private properties. the Several of the virtual functions listed above and the Get/Set functions can be implemented as inline functions at the end of BILLEVNT.H by known methods.

The following is a sample event (CNewEvent) that is defined in the BILLEVNT.H header file. This can be used as a starting point for the new class. The class CFileDownloadEvent was based on CNewEvent and resembles the following:

```
////////////////////////////////////////////////////
// CFileDownloadEvent
class BillingEventDLL  CFileDownloadEvent_0100  :  public CApplicationEvent_0100    // FDE
{
public:
    enum
    {
        sdidThis =
CSerializedBuffer::sdidCFileDownloadEvent,
        sdverThis = 0x0100,
    };
    CFileDownloadEvent_0100 ( );
    virtual ~CFileDownloadEvent_0100 ( );
    virtual SERIALIZED_DATA_TYPE_ID Sdid( );
    virtual SERIALIZED_DATA_TYPE_VERSION Sdver( );
    virtual BOOL FDisplay(CDynamicString* pstr);
    virtual BOOL FCsfVariableTitles(CDynamicString* pstr);
    virtual BOOL FToCsfString(CDynamicString* pstr);
    virtual BOOL FToSQLString(CDynamicString* pstr);
    virtual BOOL FSerializeClass(CSerializedBuffer* psb);
    // Data member access.
    const char* PszFileName( );
    CLargeInteger CbFile( );
    void SetFileName(const char* pszFileName);
    void SetFileSize(CLargeInteger cbFile);
// OK to pass a DWORD. It will be converted.
protected:
    CDynamicString m_strFileName;
    CLargeInteger m_cbFile;
};
define CFileDownloadEvent CFileDownloadEvent_0100
.
.
.
inline CFileDownloadEvent_0100::CFileDownloadEvent_0100( )
    { }
inline CFileDownloadEvent_0100::~CFileDownloadEvent_0100( )
    { }
inline SERIALIZED_DATA _TYPE _ID
CFileDownloadEvent 0100::Sdid( )
    { return sdidThis; }
inline SERIALIZED_DATA_TYPE_VERSICN
CFileDownloadEvent_0100::Sdver( )
    { return sdverThis; }
inline const char* CFileDownloadEvent_0100::PszFileName( )
    { return m_strFileName.Psz( ); }
inline CLargeInteger CFileDownloadEvent_0100::CbFile ( )
    { return m_cbFile; }
inline void CFileDownloadEvent_0100::SetFileName(const char* pszFileName)
    { m_strFileName = pszFileName;
inline                                    void
CFileDownloadEvent_0100::SetFileSize(CLargeInteger cbFile)
    { m_cbFile = cbFile;
```

Add the New Class to the SERIALIZ.H Header File

Add a new SDID to the SERIALIZ.H header file. There is a sample sdidCNewEvent in SERIALIZ.H that has been commented out. Add a SDID value before this. Shown below is a sample of the SERIALIZ.H section that defines the SDID values:

```
class SerializedBufferDLL CSerializedBuffer      // sb
{
public:
    enum
        // Application Events
        sdidCApplicationEvent,    sdidCPipeClosedEvent,
sdidCConnectionClosedEvent,
        didFileDownloadEvent, sdidCFileDownloadEvent,
<-------ADD NEW SDID HERE
        // sdidCNewEvent,
        // Service Map
        sdidCSMapService,  sdidCSMapServiceList,
sdidCsMapRouter; sdidCSMapRouterList,
        didCSMapAttachmentArray,   sdidCSMapServer,
sdidCSMapServerList, sdidCServiceMap,
        // Dynamic Array
        sdidCIPAddressArray,
    };
.
.
.
```

Add the Non-inline Functions to BILLEVNT.CPP

Add to BILLEVNT.CPP any functions from the new class that are not inline functions. Then call the base class functions to perform their appropriate functions. The non-line members of CNewEvent are defined in BILLEVNT.CPP. The following is an example of the CFileDownloadEvent class:

```
//////////////////////////////////////////////////
// CFileDownloadEvent__0100
BOOL CFileDownloadEvent__0100::FDisplay(CDynamicString*pstr)
    CDynamicString& str = *pstr;
    // Ask the base class to append it's member variables.
    CApplicationEvent__0100::FDisplay(&str);
    // Append the member variables in this class.
    str += "CFileDownloadEvent__0100 members:\n";
    str += " m__strFileName = \"";
    str += m__strFileName;
    str += "\"\n";
    str += " m__cbFile = ";
    str += StrFrom(m__cbFile, 10);
    str += '\n';
    return TRUE;
}
BOOL
CFileDownloadEvent__0100:: FCsfVariableTitles (CDynamicString*
pstr)
{
    CDynamicString& str = *pstr;
    // This prefix makes this title row sort above the data
    // rows. Only display it if this class is the base
    // data type. If a derived class is asking this function
    // to append its member fields, then the derived class
    // will have already stored its own prefix in the string
    // and this class does not need to store a prefix.
        if (str.Cch( ) == 0)
            str += "\"CFileDownloadEvent__0100__1\"";
    // Ask the base class to append it's member variable titles.
        CApplicationEvent__0100::FCsfVariableTitles (&str);
    // Append the member variable titles in this class.
        str += ",\"File Name\",\"File Size\"";
        return TRUE;
}
BOOL CFileDownloadEvent__0100::FToCsfString (CDynamicString*
pstr)
/   /   A   p   p   e   n   d   s
"m__ccs",timeOpened,timeClosed,"ElapsedTime",m__cpSent,mcbSen
t,m__cpRcvd,m__cbRcvd,m__cBadCRCs,m__cRetransmisions,m__cDataLin
kErrors,"m__strCallerId": to pstr. All values are in decimal.
{
    CDynamicString& str =*pstr;
    // This prefix makes this data row sort below the title
    // row. Only display it if this class is the base data
    // type. If a derived class is asking this function
    // to append its member fields, then the derived class
    // will have already stored it's own prefix in the string
    // and this class does not need to store a prefix.
        if (str.Cch( ) == 0)
            str += "\"CFileDownloadEvent__0100__2\"";
    // Ask the base class to append it's member variables.
        CApplicationEvent__0100::FToCsfString(&str);
    // Append the member variables in this class.
        str += ",\"";
        str += m__strFileName;
        str += "\",";
        str += StrFrom(m__cbFile, 10);
        str += '\n';
        return TRUE;
}
BOOL CFileDownloadEvent__0100::FToSQLString(CDynamicString*
pstr)
{
    CDynamicString& str = *pstr;
    // This prefix uniquely identifies this data type. Only
    // store the data type if this class is the base data
    // type. If a derived class is asking this function
    // to append it's member, fields then the derived class
    // will have already stored it's own prefix in the string
    // and this class does not need to store a data type.
        if (str.Cch( ) == 0)
            str.sprintf ("%x\t%x", sdidThis, sdverThis);
    // Ask the base class to append it's member variables.
        CApplicationEvent__0100::FToSQLString (&str);
    // Append the member variables in this class.
        str += "\t";
        str += m__strFileName;
        str += "\t";
        str += StrFrom(m__cbFile, 16);
        return TRUE;
}
BOOL
CFileDownloadEvent__0100::FSerializeClass(CSerializedBuffer*
psb)
{
    CSerializedBuffer& sb = *psb;
    if (!sb.FBeginDataType (sdidThis, sdverThis))
        return FALSE;
    // Ask the base class to serialize it's member variables.
        CApplicationEvent__0100::FSerializeClass (&sb);
    // Serialize the member variables in this class.
        if (!sb.FSerializeDynamicString (&m__strFileName))
            return FALSE;
        if (!sb.FSerializeData(&m__cbFile, sizeof(m__cbFile)))
            return FALSE;
        if (!sb.FEndDataType( ))
            return FALSE;
        return TRUE;
}
```

Now that the structure of the event objects has been discussed, the following section provides an overview of an exemplary on-line billing system that uses the event generation and collection system of the present invention. It should be noted that the event generation system can be used within many different environments including billing, marketing and system operations. The billing system described below is only one example of an environment that can benefit from the event generation and collection system of the present invention.

IV. BILLING SYSTEM OVERVIEW

Figure 5:
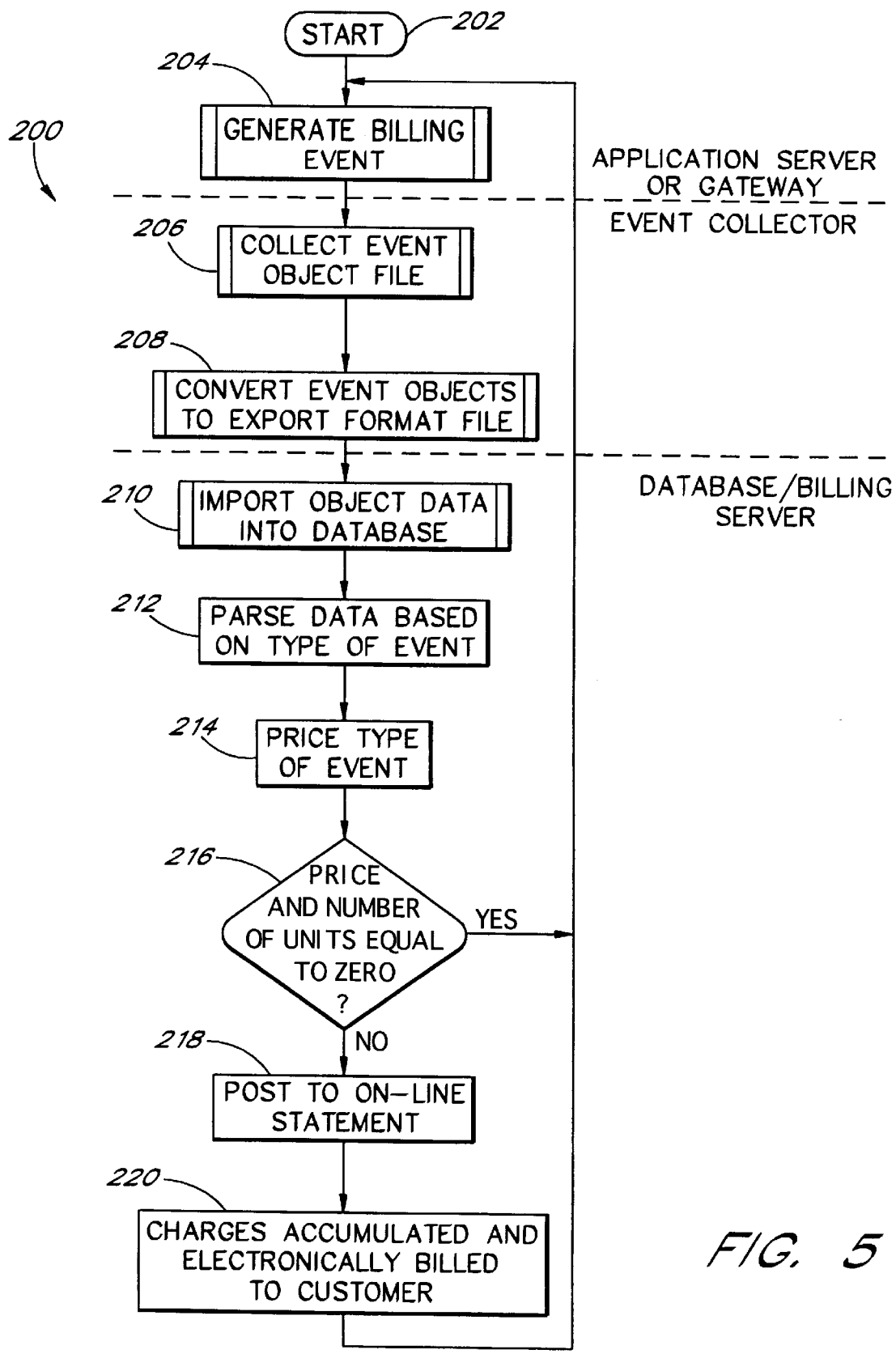
FIG. 5 is a flow diagram showing an overview of the billing system which takes advantage of the present invention.

An overview of a billing system which utilizes the event generation process of the present invention is illustrated in the flow diagram of FIG. 5. The billing process 200 begins at a start state 202. After the process 200 has begun, a billing event is generated at process 204. As described above, a billing event can be generated whenever the customer takes a particular action. For example, when a customer downloads a file, an event object is created that can then be used in the billing system to charge the customer for the file. It should be noted that this same event object can be sent to the marketing analysis server so that the marketing department can gather statistics on the particular files that are downloaded.

Figure 8:
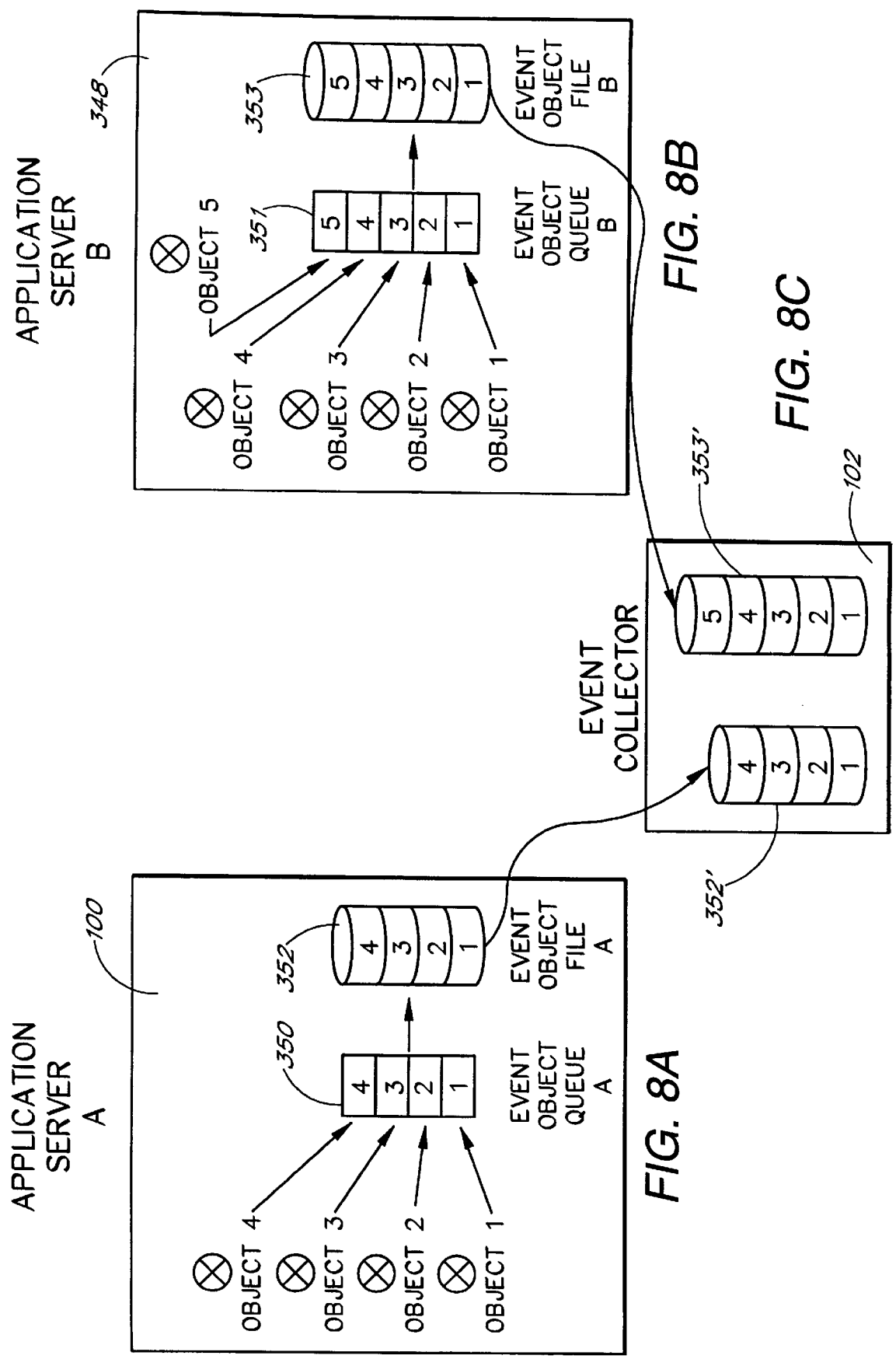
FIG. 8 is a block diagram illustrating the movement of objects from application servers to an event collector.

Billing events typically occur on either the application server 100 or gateway 12 (FIG. 2). Once a billing event has been generated at process 204 the event objects generated by the billing event are gathered by the event collector 102 at a process 206. Although the billing events generated at process 204 are produced individually, they are first saved to an event object file within either the application server or gateway (FIG. 8). Thus, the event object file is a binary compilation of a number of individual events that have been produced on the application server or gateway.

The system of the present invention has a very high throughput because objects are transferred from the source of the event to the event collector as binary compilations called event object files. Because the data stored within the objects of the event object file that is collected at process 206 cannot be exported easily to other systems, the file is converted to an export format file at process 208. The export format file contains data that is stored within the event objects, but is in a format which is easily read by other programs. For example, one type of export format file would be a tab-delimited text file. In this type of file, all of the data that resided within the object is read and placed in a tab-delimited text format. This type of file can then be easily imported into a database server.

Once the process 200 has converted the event object file to an export format file at process 208, the database server 104 imports the object data stored in the export format file into its database at process 210. The database can be part of a SQL server running within the host data center 14 or can be located at a remote site. Other database servers would function in a similar manner.

After the process 210 has imported data from the objects into a database, the data is parsed based on the type of event at a state 212. Currently, there are two major categories of event types which are parsed at state 212. These event types are transaction events and time-based events. Other event types are conceivable.

One example of a transaction event is a file download by the customer 10 from an application server. By downloading a file the customer is charged a set fee per download. The file download procedure is preferably handled by the FTM-SRV.DLL service. A time-based event is one wherein charges accumulate over a period of time. For example, accessing stock quotes on a distributed network may incur charges for every minute that the customer remains on-line. The customer is then billed a set fee for every minute of on-line time in the stock quotes area.

Once the object data has been parsed at state 212 it is priced at a state 214. To determine the appropriate price for either a transaction based event or time based event, the system 200 refers to pricing rules that have been programmed into the system. The pricing rules give the system flexibility for charging different customers varying prices based on many different parameters. For example, a 10% discount from the normal price can be given on Tuesdays and Thursdays. This would be one type of a pricing rule. Other pricing rules might give discounts to certain groups of individuals having specific customer ID numbers. As an example, a discount may be given to customers who work for a particular corporation.

Similarly, pricing rules can affect time-based event charges. For example, usage fees for accessing the distributed network can be lowered or removed for certain groups of individuals. After a particular price has been associated with an event using the pricing rules, the system 200 makes a decision whether the price is greater than zero at a decision state 216.

If the price is greater than zero at the decision state 216 then it is posted to the customer's on-line statement at state 218. However, if the price is not greater than zero at decision state 216, the process 200 skips state 218 and continues to wait for billing events to be generated by looping back to process 204. However, if the price is greater than zero at decision state 216 and thereafter posted to the on-line statement at state 218, charges are accumulated and electronically billed to the customer at state 220.

Figure 6:
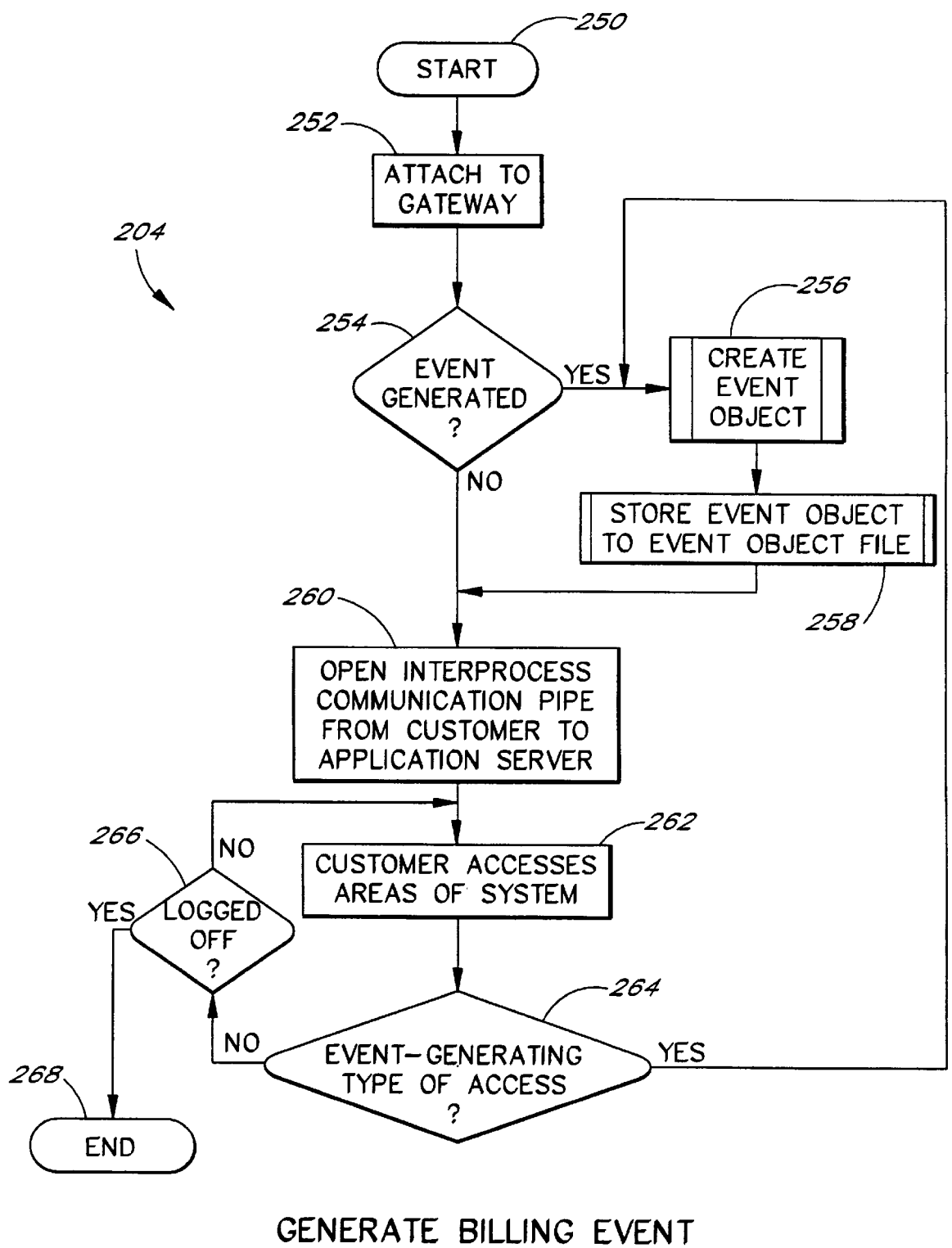
FIG. 6 is a flow diagram of the generate billing event process shown in FIG. 5.

To more specifically describe the billing process, FIG. 6 provides a detailed view of the generate billing event process 204 of FIG. 5.

A. Generating Events

Referring now to FIG. 6, the generate billing event process 204 begins at a start state 250. Following start state 250, the customer attaches to the gateway computer at a state 252. The customer can attach to the gateway computer by many methods known within the art. For example, the customer can use a telephone modem to dial the phone number of an on-line service provider. Alternatively, the customer may have a direct connection to the network over dedicated telephone lines or a TCP/IP network.

Once the customer has attached to the gateway at state 252, a query is made at decision state 254 whether or not an event has been generated at the gateway. The type of event that might be generated by the gateway computer could be, for example, a login, logoff, open pipe, open connection, or other type of event. If an event is generated during attachment to the gateway at decision state 254, then an event object is created at process 256. The process of creating objects will be explained in more detail below in reference to FIG. 8.

After the event object has been created, it is stored to an event object file at process 258. The process of storing event objects to an event object file 258 is explained in more detail in reference to FIG. 9. After the event has been created at process 256 and stored to an event object file at state 258, the process 204 opens an interprocess communication pipe from the customer to the application server at state 260.

However, if an event is not detected at decision state 254, the process moves directly to state 260 so that an interprocess communication pipe can be opened from the customer to the application server. As discussed previously, more than one interprocess communication pipe can exist between a particular customer and application servers at the host data center. After a pipe has been opened to the application server, the customer accesses various areas of the system at state 262 while looking through applications and services of the distributed on-line network.

As the customer accesses these various areas of the on-line network, the process 204 waits for a type of access that generates an event. One type of access might be a file download, for instance. If the process 204 determines that the customer has accessed an area of the system which would generate an event at decision state 264, then the process 204 returns to process 256 to create a new event object. However, if the customer's type of access does not generate an event at decision state 264, then the process 204 queries whether the customer has logged off the system at a decision state 266.

If the customer has not logged off the system at decision state 266, then the process 204 loops back to where the customer continues accessing areas of the system at state 262. However, if the customer has logged off at decision state 266, then the process ends at an end state 268.

B. Create Event Object

Figure 7:
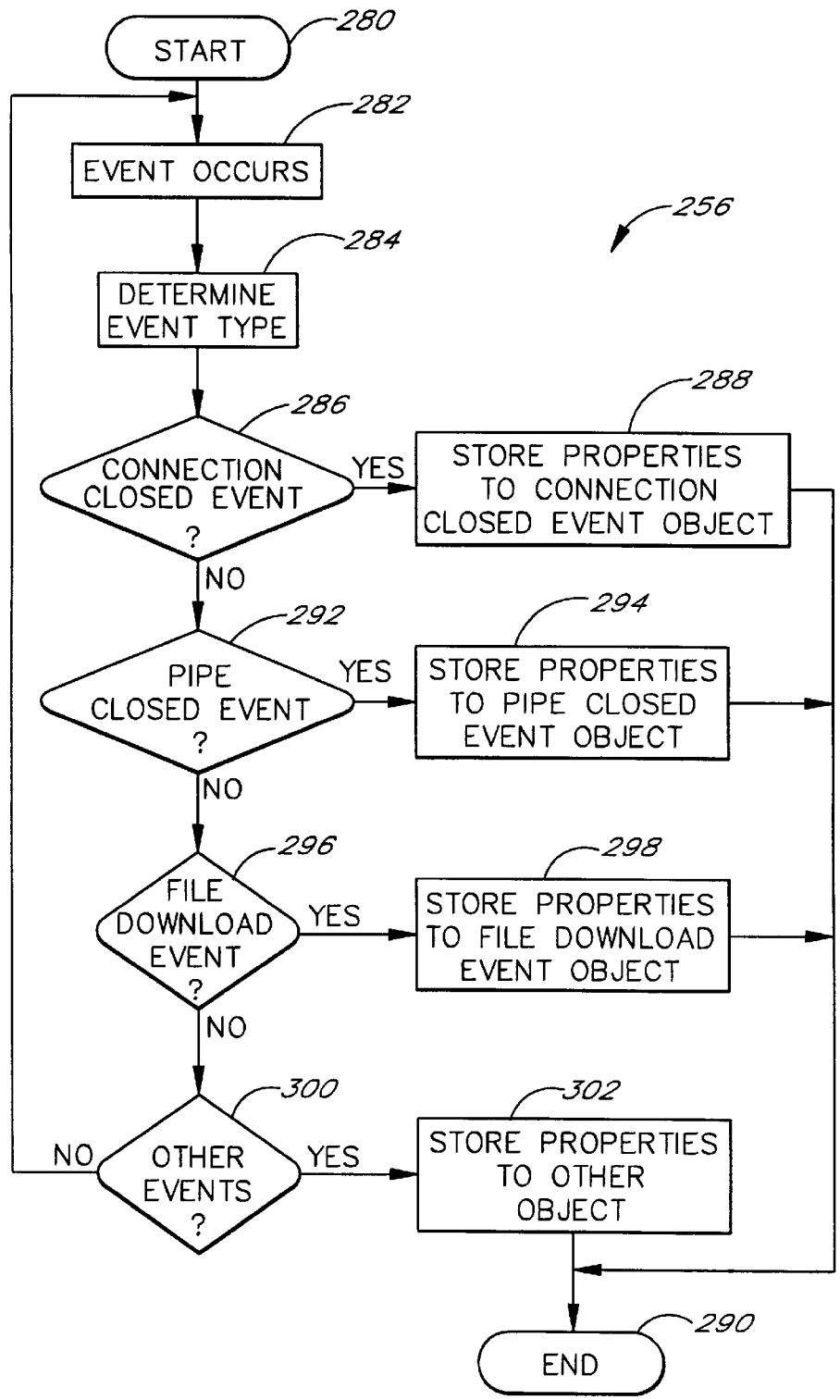
FIG. 7 is a flow diagram of the create event object process shown in FIG. 6.

FIG. 7 is a detailed view of the create event object process 256 shown in FIG. 6. This process begins at a start state 280 and then continues to state 282 where an event occurs. Preferably, this process uses the MOSSUDLL.DLL. As discussed above, an event can occur whenever a customer logs on or logs off to a system or accesses an area of the on-line distributed network which has been designed to generate an event.

Once an event has occurred at state 282, the process 256 determines the type of event at a state 284. After the type of event has been determined at state 284, a query is made at decision state 286 whether or not the current event type is a connection closed event. If the current event type is a connection closed event at decision state 286, then the properties of the event are stored to a connection closed event object at state 288.

An example of some properties that may be stored to a connection closed event are described above in Table 1 and FIG. 4. Some properties that are unique to the connection closed event are shown below.

Once the properties of the connection closed event have been stored to the event object at state 288, the process ends at an end state 290.

However, if the current event type is not a connection closed event at decision state 286, then the process 256 queries whether a pipe closed event has occurred at a decision state 292. If a pipe closed event has occurred at the decision state 292, then the properties of the event are stored to a pipe closed event object at state 294. Some properties that are unique to the pipe closed event are shown below.

| | CPipeClosedEvent Properties | |
|---|---|---|
| DATA TYPE | VARIABLE NAME | DESCRIPTION |
| PIPE_CLOSED_STATUS | m_ccs; | Reason for closing pipe |
| time_t | m_timeOpened; | Time pipe opened |
| time_t | m_timeClosed; | Time pipe closed |
| DWORD | m_cSecActive | Number of seconds the pipe was actually active. |
| DWORD | m_cpSent | Count of packets sent |
| DWORD | m_cbSent | Count of bytes sent |
| DWORD | m_cpRcvd | Count of packets received |
| DWORD | m_cbRcvd | Count of bytes received |

Once the properties have been stored to the pipe closed event object at state 294, the process ends at the end state 290.

If the current event type, as determined at state 284, is not a pipe closed event, then the process 256 decides whether a file download event has occurred at a decision state 296. If a file download event has occurred at decision state 296, then the properties of the event are stored to a file download event object at state 298. Some properties that are unique to the file download event are shown below.

| | CConnectionClosedEvent Properties | |
|---|---|---|
| DATA TYPE | VARIABLE NAME | DESCRIPTION |
| CONNECTION_CLOSED_STATUS | m_ccs; | Reason for closing connection |
| time_t | m_timeOpened; | Time connection opened |
| time_t | m_timeClosed; | Time connection closed |
| DWORD | m_cSecActive | Number of seconds the connection was actively transmitting or receiving |
| DWORD | m_cpSent | Count of packets sent |
| DWORD | m_cbSent | Count of bytes sent |
| DWORD | m_cpRcvd | Count of packets received |
| DWORD | m_cbRcvd | Count of bytes received |
| DWORD | m_cBadCRCs | Count of CRC errors |
| DWORD | m_cRetransmissions | Count of retransmissions |
| DWORD | m_cDataLinkErrors | Count of datalink errors |

| CFileDownloadEvent Properties | | |
|---|---|---|
| DATA TYPE | VARIABLE NAME | DESCRIPTION |
| CDynamicString | m_strFileName | Name of file downloaded |
| CLargeInteger | m_cbFile | Byte count of file |
| UINT | m_uCurrency | Currency Code |
| UINT | m_uAmount | Currency Amount |
| DWORD | m_dwVendorId | Vendor ID number |
| UINT | m_uUnit | Type of Units |

Once the properties have been stored to the file download event object at state 298, the process 256 ends at the end state 290.

However, if the event type is not a file download event as determined at decision state 296 then the process 256 queries whether an other event has occurred at decision state 300. If a different event has occurred at decision state 300, then the process 256 stores the properties for the event in the other object at state 302. Once properties associated with the current event are stored to an object at state 302, the process ends at the end state 290. If no other event has occurred at decision state 300, then the process 256 loops back to state 282 where the process waits for an event to occur.

Now that events have been created, the system needs an efficient mechanism for moving the event objects through the system. As explained below, the system stores event objects in an event object file so that many events can be transported through the system simultaneously.

C. Storing Objects to Event Object Files

FIG. 8 shows a block diagram of the process the system of the present invention undertakes to create and collect event objects. As shown, the application servers 100 and 348, located respectively at the host data center 14 and the remote data center 26, create objects which are stored into, respectively, event object queues 350 and 351.

The event object queues 350, 351 are normally stored in memory within the application server so that the objects can be rapidly saved to a single file. The event object queues 350, 351 hold instantiated objects whose property values have already been set.

The process of adding objects into the event object queues is ongoing while the application servers 100, 348 are being accessed by customers. A separate background thread running on the application server removes the events from the event object queues 350, 351 and serializes and stores the event objects to the event object files 352 and 353, respectively. This background storage thread is preferably a Microsoft Windows NT thread running within the Microsoft Network transport service software. The background storage thread functions by searching the event object queue for an event object and then serializing and storing the objects from that queue.

This storage thread momentarily gains control of the queue, removes the object at the head of the queue, and claims ownership of it. The storage thread then relinquishes control of the event object queue so that other objects can be appended. After the background thread has claimed ownership of the "head" object in the queue, it creates a binary representation of the object in a memory buffer. This process is explained more completely in reference to FIG. 9.

At some point during the process of serializing objects from the event object queues 350, 351 to the event object files 352, 353, the application server closes the current event object file and begins serializing data into a new file. This process can be programmed to occur, for example, every fifteen minutes. After a selected period of time has passed, an import thread on the event collector makes a request to retrieve all of the closed event object files from the application server. These files are stored by the event collector in files 352' and 353'. The import thread running on the event collector is preferably running within a Windows NT service. It can be noted that all of the configurable options discussed above (e.g. sleep times) are preferably programmed within that Windows NT Registry. In addition, the priority of the thread output buffer cache sizes can also be set in the Registry. This process will be explained in more detail in reference to FIG. 10.

Figure 9:
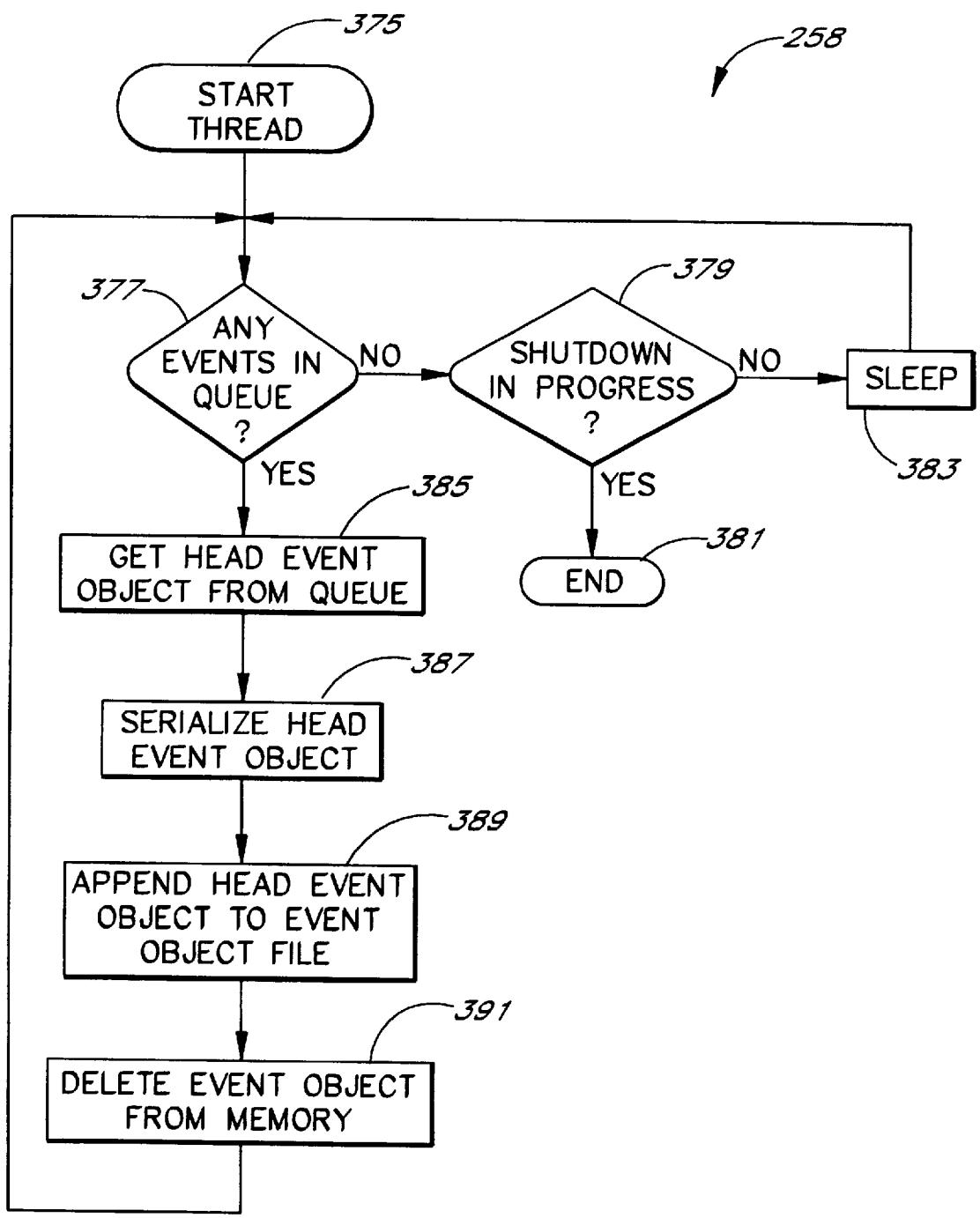
FIG. 9 is a flow diagram of the store event object to event object file process of FIG. 6.

FIG. 9 diagrams the process that background thread uses to gather events from the event object queue and serialize them to an event object file. The process 258 begins when the thread starts at start state 375 and then determines whether any events are in the event object queue at a decision state 377. If there are no events in the event object queue at decision state 377, then the system determines whether a shutdown of the server is in progress at decision state 379. If a shutdown is in progress at decision state 379, then the process 258 ends at an end state 381.

If there is no shutdown in progress at decision state 379, then the process 258 sleeps for a set period of time at a sleep state 383 before looping back to decision state 377 to determine whether any event objects are in the event object queue. The amount of time that the process 258 sleeps at state 383 can be altered to improve the performance of the overall system. The system may sleep for a matter of seconds, minutes or even hours. This sleep time can be manipulated to gain the best performance while trying to maintain a low processing overhead.

If the process 258 determines that there are events in the event object queue at decision state 377 then it moves to a state 385 wherein it gets the head event object from the event object queue. Once the process 258 has gained control of the head event object at state 385 it serializes the head event object into a memory buffer at state 387. This serialization protocol creates a binary representation of the event object in the memory buffer. Once the head object has been serialized to the temporary memory buffer it is appended to the event object file at state 389. It should be noted that a write cache can be used to buffer the process of saving the serialized objects to a storage.

Thus, the event object file (see, e.g., 352 at FIG. 8) will continue to grow as events are serialized from the binary memory buffer into the event object file. As discussed previously, at some point the event collector tells the application server to close the current event object file and open a new file so that the current event object file can be copied from the application server to the event collector. This is the mechanism that keeps the event object file from growing too large. The frequency by which the event collector gathers event object files can be configured to provide the maximum throughput of event objects from creation to collection at the event collector.

Once the event object has been appended to the event object file at state 389 it is deleted from system memory at state 391. After deletion, the system loops back to decision state 377 wherein it determines whether any event objects are in the queue. This entire process is discussed in the following pseudocode.

```
//   Global variables
CMsgBufAEVToLogFile g_mbufOutputQueue;
//   Output queue where application events are placed until they are
```

-continued

```
//   dequeued, serialized and then written to disk. This object
//   contains the background dequeuing thread that serializes the
//   objects to a binary format and appends them to a CLogFile.
//   Some of the member objects that this object contains are:
//
//   CLogFile lf;       // Owns the output file that contains all of
the
//                      // binary version of the Appevents. All reading
//                      // and writing of this file is done through this
//                      // object.
.
.
.
//   At this point, a connection has been closed. Create an
//   event that documents the connection details.
CConnectionClosedEvent_0101* pcnx = new
CConnectionClosedEvent_0101;
//   At this point, the uninitialized object exists. Configure
//   it's properties.
pcnx->SetUserId ()
pcnx->SetStartTime ();
.
.
.
//   Move the ConnectionClosed event into the output queue and
//   let the background thread start the serialization and
//   storage process. After this call, the queuing/dequeuing object
//   has ownership of the application event object and this
//   code releases control of the ApplicationEvent object.
g_oq.AddObject (pcnx);
.
.
.
//   Dequeuing algorithm executed by background dequeuing
//   thread after the object creates it:
//   At this point, the queue has ownership of all the enqueued
//   AppEvent objects. Remove the object at the head of the
//   queue and get ownership of it.
CConnectionClosedEvent_0101* pcnx = GetNextObject ();
//   At this point, this background thread has ownership of this
//   one event. We now need to write a binary representation
//   of that object to disk. First we need to get a binary
//   representation of the object into a memory buffer. Create
//   an instance of the CSerializedBuffer smart serialization object.
CSerializedBuffer buf;
//   At this point, we have a complete empty binary buffer.
//   Ask the application event to write a binary representation
//   of itself into the CSerializedBuffer. As the object, and
//   its parent objects write member properties into the buffer, the
//   buffer object itself will automatically setup boundaries and
//   checksums around each of the embedded objects and their
//   member properties as they are appended to the buffer.
pcnx->Serialize (&buf);
//   At this point, the CSerializedBuffer now contains a complete
//   binary representation of the CConnectionClosedEvent_0101
//   and all of it's member variables, its parent class
//   CConnectionClosedEvent_0100 and all of its member variables.
//   Get the address of the CSerializedBuffer's internal binary
//   buffer (via GetBuffer()), and the size of that binary
//   buffer (via GetSize()) and ask the output file to add a new
//   entry to the end of the file using the binary buffer.
m_lf.AddTail (buf.GetBuffer(), buf.GetSize());
//   At this point, the object has been serialized and saved to
//   disk. We don't need the object anymore. Delete it.
delete pcnx;
```

Now that an event object file has been created on the application server, the details of collecting that file are explained below in FIG. 10.

D. Collecting Events

Figure 10:
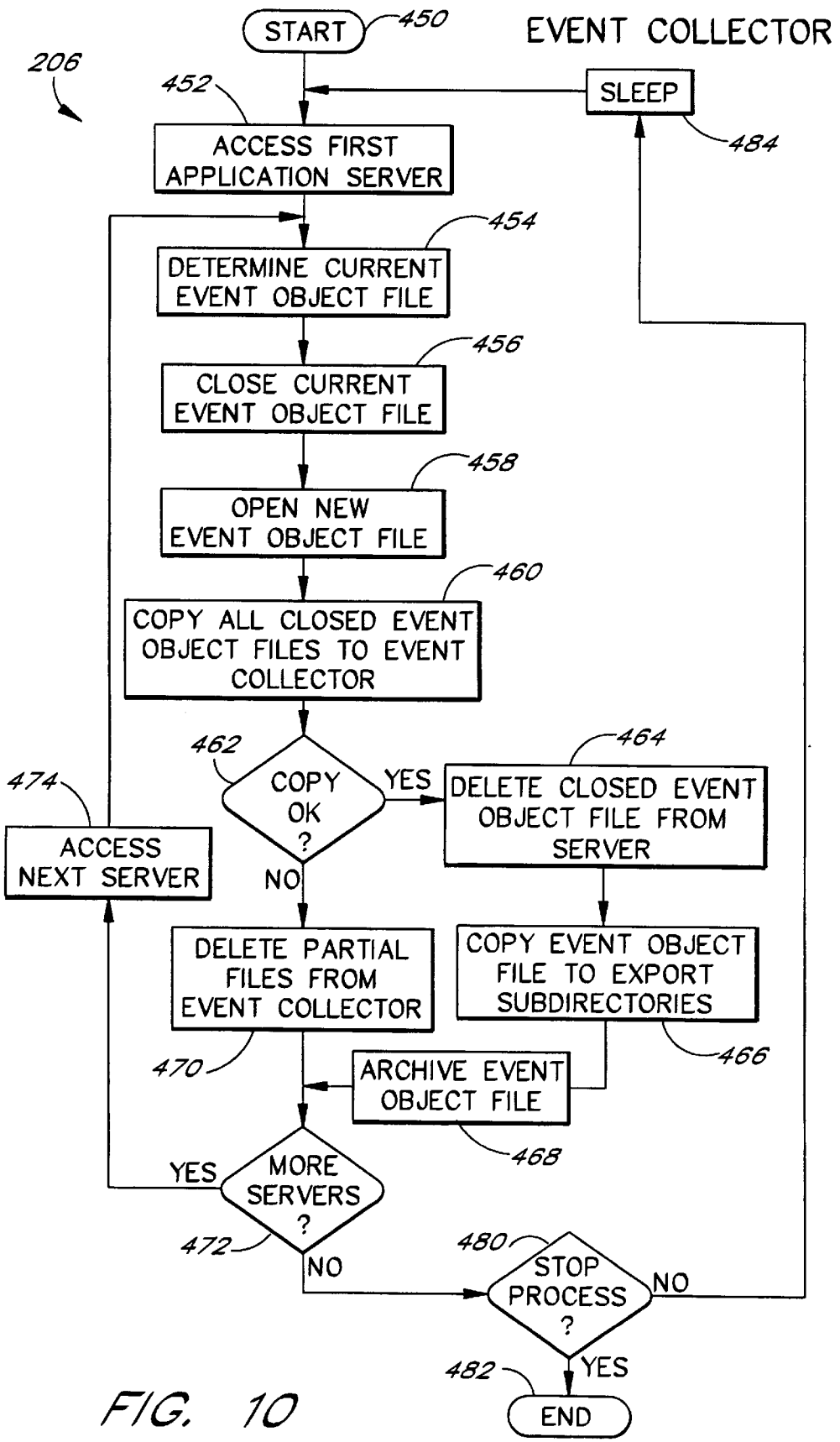
FIG. 10 is a flow diagram of the collect event object file process of FIG. 5.

FIG. 10 shows the process 206 of collecting event object files from various application servers throughout a distributed network. Preferably, this process uses the AEVCOLL.EXE Windows NT service. The process of collecting events begins at a start state 450 and moves to state 452 wherein the event collector accesses the first application server or gateway computer to find an event object file. Once the first application server or gateway has been accessed at state 452 the process determines the current event object file at state 454. The current event object file is the file which is accepting objects from the event object queue.

Since the current application server needs to continue serializing objects from the event object queue into an event object file, the event collector instructs the application server to close the current event object file at a state 456 and open a new event object file at a state 458. Thus, the thread running on the application server which serializes event objects from the queue to an event object file will now start serializing event objects to a new event object file.

By using this process, the current event object file will be closed and therefore ready for copying to the event collector. Once a new event object file has been opened at state 458 all of the closed event object files on the event source computer are copied to the event collector at state 460.

All of the event object files are copied because it is possible that a partial copy occurred in the previous round of moving event object files to the event collector. Therefore, more than one closed event object file may remain on the application server or gateway computer. This will be more easily understood in the following description.

Once all of the closed event object files have been copied to the event collector a query is made at decision state 462 whether the copy completed correctly. If the copy completed correctly at decision state 462 then the closed event object files are deleted from the application server at state 464. Once the event object files are deleted from the server at state 464 they are copied to individual export subdirectories on the event collector at state 466.

At this time, multiple copies of the same event object file are distributed across numerous export subdirectories on the event collector. The process 206 makes multiple copies so that each export thread which pulls event object files from their own subdirectories will have a complete list of all event objects which have been created on the application servers. These export threads can therefore act knowing that they have a complete list of all event objects that have been generated in the distributed networking system. The reason that each thread has its own copy of the event object file is so that multiple export threads can act simultaneously without blocking one another.

Once the event object files are in the export subdirectories the original event object file which was copied from the application server is moved to an archive subdirectory on the event collector at state 468 and eventually archived to a streaming tape, CD ROM or other backup mechanism.

However, if the copy of the event object file from the application server to the event collector did not complete correctly at decision state 462 then any partial files which were copied are deleted from the event collector at state 470. At this point, a closed event object file is still maintained on the application server and will be gathered on the next cycle of process 206 because, as discussed above, all closed event object files are copied by the import thread into the event collector.

After either deleting partial files from the event collector at state 470 or archiving the copied event object file from the event collector at state 468 the process 206 determines whether more servers exist which have not yet been accessed at a decision state 472. If more servers exist on the distributed networking system that have not yet been accessed by the event collector then the next server is accessed at state 474. Once the next server has been accessed at state 474 the process 206 loops back to determine the current event object file at state 454 and the process continues as described above.

However, if no more servers exist which have not been accessed in the current round of collecting events at decision state 472 then a query is made whether the process has stopped at decision state 480. If the process has stopped at decision state 480 then the entire import process finishes at an end state 482. If, however, the process has not stopped at decision state 480 then it sleeps at a state 484 for a set period of time before beginning to access a first application server at state 452 and continuing as described above. The polling of application servers will normally be in round robin order with all application servers in a data center accessed sequentially as a group. Of course, other polling algorithms are possible.

The amount of time that the process 206 sleeps at state 484 can be configured to maximize the overall number of event object files which are collected by the event collector.

FIG. 10 describes a method for accessing application servers and collecting event object files which are then eventually copied to export subdirectories on the event collector computer. As discussed below in reference to FIG. 11 the event object files which now reside in export subdirectories are converted into export format files.

E. Converting Event Object Files to Export Format Files

Figure 11B:
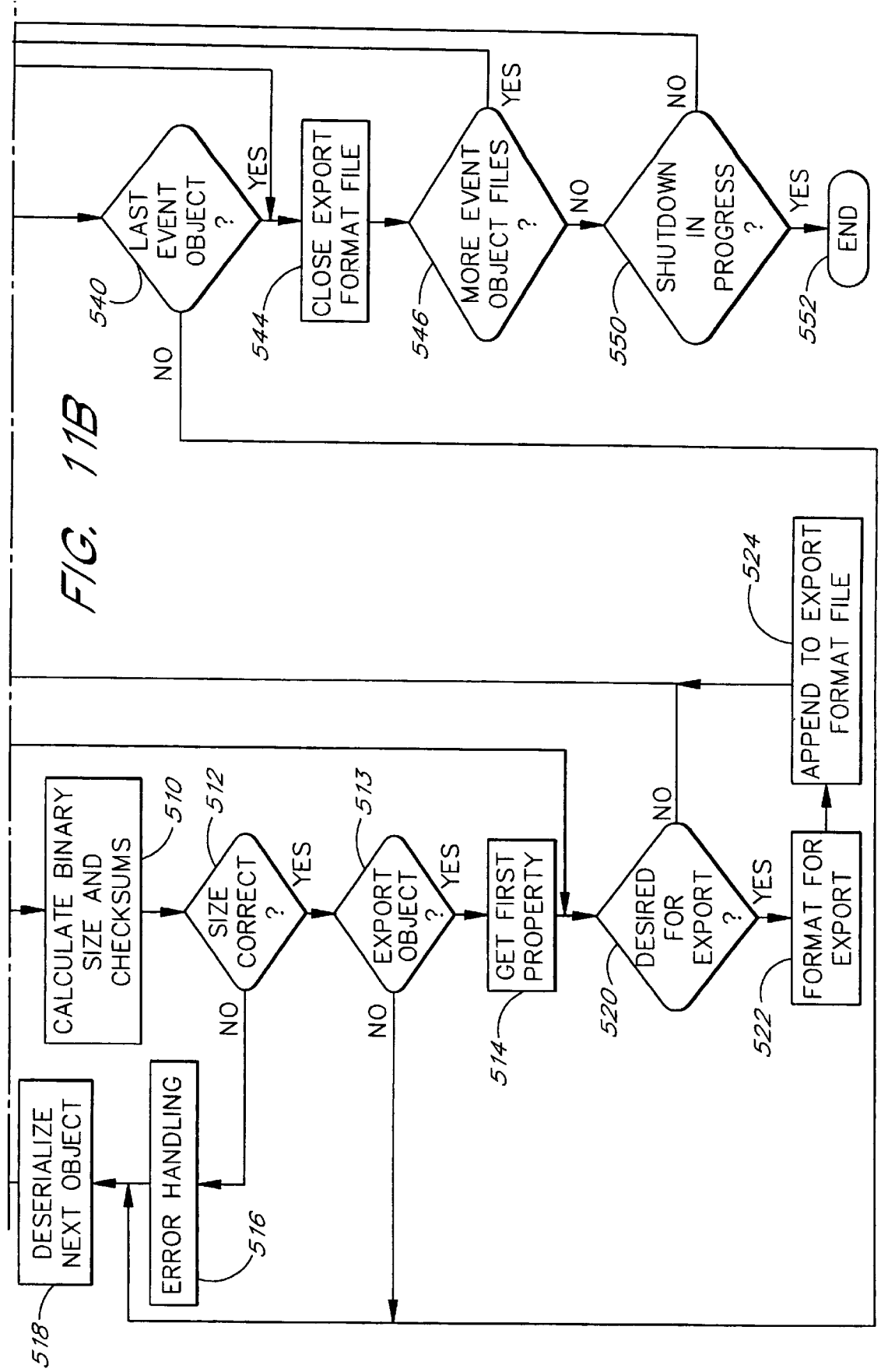

Referring now to FIG. 11, an export thread starts at state 500. The export thread can preferably be a Windows NT background service thread. However, other background or foreground processes could function in a similar manner. Once the export thread has started at state 500 a unique subdirectory containing export format files is identified at state 502. Once the unique subdirectory has been identified at state 502 the first event object file is opened in the identified subdirectory at state 504. An export format file (FIG. 12) is then created at state 506 but, at this point, contains no data. The export format file created at state 506 will eventually hold all of the desired data from the event object file.

Once the export format file has been created at state 506 the first event object in the event object file is deserialized at state 508. During deserialization the binary size and checksums for the first event object which were previously stored in the event object file are calculated at state 510. If the calculated binary size and checksums match the deserialized first object at a decision state 512 then a determination is made at a decision state 513 whether to export the event.

However, if the size of the deserialized first object does not match the calculated binary size or checksums from state 510 then an error handling routine is begun at state 516 to rectify the error. After the error handling routine at state 516 correctly retrieves the properties of the deserialized first object the next object is deserialized at a state 518. The process then loops back to calculate the binary size and checksums of the newly deserialized object at state 510.

If the binary size of the deserialized first object was correct at decision state 512 and the object is going to be exported at decision state 513, then the first property is retrieved at state 514. However, if the object is not going to be exported at decision state 513, then the process loops to state 518 so that the next object can be deserialized.

After the first property within the deserialized first object is retrieved at state 514 a query is made at decision state 520 whether this particular object is desired to be exported. This decision is based on whether the event ID of the deserialized first object matches the desired type of event ID for this particular export thread. For example, this particular export thread may only be interested in exporting data from event objects which come from file downloads. Thus, this export thread will look for CFileDownload event objects as shown in the event object class hierarchy of FIG. 4.

By screening the event object file for only those particular event objects which are desired for output, each individual export thread can analyze the complete set of objects in an event object file but retrieve only those particular event objects that it wishes to export. Other export threads may only export pipe closed events, connection closed events, or any other particular event which has been chosen for export.

Because the preferred operating system, Windows NT, is multi-threaded it can simultaneously process many different export threads which are working on event object files in their home subdirectories. Each export thread has its own subdirectory which is identified at state 502 of FIG. 11. Therefore, many different export processes can be carried out simultaneously.

If a decision is made at decision state 520 that the particular deserialized event object is desired for export then it is formatted for export at state 522. A property is formatted for export at state 522 by placing it in a particular configuration which will then be read by an import thread which will be discussed below. One particularly desirable format is tab-delimited text, as is known in the art. Other formats which may be used without departing from the spirit of the present invention could be comma-delimited text, semicolon-delimited text, fixed-width text or binary code. Once the particular property has been formatted for export at state 522 it is appended to the export format file at a state 524.

The process then determines whether the desired property was the last property within this particular object at a decision state 526. If, however, this property was not desired for export at decision state 520 the process moves directly to decide whether this was the last property at the decision state 526. If the retrieved property was not the last property at decision state 526 then the next property is retrieved at a state 528. The process then moves back to decision state 520 to determine whether this newly retrieved property is desired for export.

However, if it was determined that this was the last property at decision state 526 then another decision is made at decision state 530 whether or not all the data in the retrieved event object was correctly deserialized. If all the data was not correctly deserialized at decision state 530 then the export is aborted at a state 532. If the export is aborted at state 532 then the previous events and properties are removed from the export format file at a state 534. The previous events are removed from the export format file at state 534 to ensure that no incorrectly deserialized data is placed in an export format file. This ensures that accurate data is processed through the remainder of the system. For example, if incorrect data was deserialized and not removed from the export format file it could lead to billing or other errors within the distributed network system.

After all previous events were removed from the export format file at state 534 the file is moved to an error subdirectory at state 536. At the error subdirectory other processes can be used to repair the event object file so that the data can be correctly deserialized and run through the remainder of the system.

Once the event object file has been moved to an error subdirectory at state 536, the export format file is closed at a state 544 and a determination is made at a decision state 546 whether more event object files exist. If another event object file does exist, then the process opens the next event object file in the identified subdirectory at a state 538 and the process then moves to create an export format file at state 506 as discussed above.

If all the data was deserialized properly at decision state 530 then a further decision is made at decision state 540 whether this was the last event object in the event object file. If this was not the last event in the event object file the next object is deserialized at state 518 and the process continues as discussed above to calculated the binary size and checksums at state 510. However, if this was the last event object in the event object file at decision state 540 then the export format file is closed at a state 544 and a query is made whether more event object files exist at the decision state 546 as discussed above. If more event object files do exist in the export subdirectory at state 546 then the process loops to state 538 wherein the next event object file is opened.

The process then continues as discussed above to create an export format file at state 506 and deserialize the first object at state 508. If no more event object files are available at decision state 546 then the system queries whether a shutdown is in progress at state 550. If a shutdown is in progress then the process ends at an end state 552. However, if no shutdown is in progress at decision state 550 then the process sleeps at a sleep state 554 before continuing to identify a unique subdirectory at state 502 and continuing as discussed above.

FIG. 12 is a block diagram which illustrates retrieving an event object file, converting it to an export format file which is then imported into a database server. As shown, the event object file 353 is acted upon by two export threads 600, 602. Each export thread removes specific objects from the event object file 353 and converts them into particular export format file configurations 604, 606. However, as discussed above, the export threads normally work on separate copies of the same event object file so that they will not block one another.

Export converter thread 600 converts the event object file 353 into an export format file 604 whereas export converter thread 602 converts event object file 353 into export format file configuration 606. As can be seen, export format file 604 differs from export format file 606 although they both derive from the event object file 353. As explained above, each export converter thread running on the event collector can process copies the same event object file into different export format file configurations. Once the export format file 604 has been created and saved to a particular subdirectory on the event collector 102 it can be thereafter imported into an import database 608 in a billing server 108.

Now that the export format files have been created they are made available to various processes within the distributed network. For example, a billing server can import the export format files and filter out the data that pertains to billable events. One type of billable event data that might be sent to a billing computer, for instance, would be the number of file downloads that are made by a particular customer. Because a retail price may need to be charged for the downloaded software, this type of event would be retrieved by a billing server and then used to calculate download charges for a customer.

Other processes within the network, such as a marketing computer, can access the export format files and filter out the data that pertains to marketing decisions. An example of data that might be useful to the marketing department of a company could be, for example, the number of users in a particular geographic area. By knowing how many users are in a particular area, the marketing department can decide how strong or weak of an advertising campaign to make in that region.

V. CONCLUSION

The event generation and collection process of the present invention provides important advantages for on-line service providers. By generating a configurable event for virtually any process that needs to be monitored, the on-line service provider has tremendous capabilities to ascertain information from its customer base. In addition, specific features of the event objects discussed herein give the event generation system of the present invention a great amount of efficiency and flexibility.

For example, the CApplicationEvent class contains virtual functions that control how the object serializes and deserializes itself from persistent storage. Because these functions are built into the object, generic computer processes for controlling persistent storage of these objects can be programmed. Therefore, new objects can be added to the system without having to modify the underlying operating system functions.

In addition, the objects that are generated are not transmitted one at a time throughout the system. Rather, they are transferred as event object files which can contain hundreds or thousands of event objects. The efficiency of the event generation system is greatly enhanced by transferring thousands of objects through the system at a time instead of moving only one object at a time.

What is claimed is:

1. A method of handling a billing event in an on-line network, the method comprising the steps of:

providing a class hierarchy of billing events wherein each defined billing event is indicative of a customer computer access to the on-line network;

generating a billing event object from the billing event class in response to the customer computer accessing a server computer in the on-line network; and serializing and collecting the billing event object generated on said server computer in the on-line network into a storage.

2. The method of claim 1, wherein the class hierarchy includes a connect event.

3. The method of claim 1, wherein the class hierarchy includes a download event.

4. The method of claim 1, wherein the customer computer accessing the server computer comprises connecting to an application server.

5. The method of claim 4, wherein the customer computer accessing the server computer is through a gateway.

6. The method of claim 1, wherein the billing event object is generated at a data center.

7. The method of claim 1, wherein the generated billing event object includes properties.

8. The method of claim 1, wherein the collecting step takes place at a billing event collector computer.

9. The method of claim 1, wherein the storage comprises a file.

10. The method of claim 1, wherein the collecting step includes the step of polling a plurality of billing event generation servers.

11. The method of claim 1, wherein the billing event object includes the customer ID and time of day.

12. The method of claim 1, further comprising the step of providing data within the billing event object to a billing system.

13. The method of claim 1, additionally comprising the step of providing data within the billing event object to a marketing analysis computer system.

14. The method of claim 1, wherein the billing event object is generated by an applications server.

15. The method of claim 1, wherein the billing event object is generated by a gateway.

16. The method of claim 1, further comprising the step of storing the billing event object into an event object queue.

17. The method of claim 16, wherein collecting the billing event object into a storage includes the steps of removing the billing event object from the event object queue and serializing the billing event object.

18. A billing event object generating system, comprising:
a plurality of computing devices connected together into a network;
a plurality of billing event object generators located in at least a portion of the computing devices, wherein billing event objects are generated which are indicative of actions within the network, and each billing event object generator serializes and stores a billing event object in a billing event generation file in a persistent storage;
a billing event collector connected to the network which periodically retrieves the billing event generation files from the billing event object generators.

19. The system of claim 18, wherein the computing devices include client and server computers.

20. The system of claim 18, wherein the network is an on-line network and the actions include a file download event.

21. The system of claim 18, wherein the persistent storage comprises a hard disk drive.

22. The system of claim 18, wherein the persistent storage includes a file system.

23. The system of claim 18, wherein the billing event object generators execute on server computers.

24. The system of claim 18, wherein the billing event collector exports the billing event object into a plurality of export formats.

25. The system of claim 24, further comprising a plurality of export subdirectories, wherein the billing event collector places at least one of the billing event generation files in at least two of the export subdirectories.

26. The system of claim 18, additionally comprising a first program responsive to one export format and a second program responsive to another export format.

27. The system of claim 26, wherein the second program comprises a marketing statistics program.

28. The system of claim 26, wherein the first program comprises a billing program.

29. The system of claim 28, wherein a first thread of the billing event object generator stores the billing event object in an event object queue, and a second thread of the billing event object generator retrieves the billing event object from the event object queue, serializes the billing event object, and stores the serialized billing event object in the billing event generation file.

30. The billing event object generating system of claim 18, wherein a plurality of the billing event object generators are located within a plurality of computers distributed within the network, and the billing event collector centrally retrieves the billing event generation files from the plurality of billing event object generators distributed within the network.

31. The billing event object generating system of claim 18, wherein the billing event collector deserializes the billing event object within the retrieved billing event generation files.

32. A method of handling a billing event in an on-line network generated from a plurality of computer servers within an on-line network, the method comprising the steps of:
providing a class hierarchy of billing events wherein each defined billing event is indicative of a customer computer access to the on-line network;
generating a first billing event object from the billing event class in response to the customer computer accessing a first server computer in the on-line network;
generating a second billing event object from the billing event class in response to the customer computer accessing a second server computer in the on-line network;
storing the second billing event object in a second event object queue,
removing the second billing event object from the second event object queue,
serializing the second billing event object, and
storing the serialized second billing event object in a local storage in the second server computer; and
collecting by an event collecting computer the first and second billing event objects generated on said first and second server computers in the on-line network into a storage, including collecting the serialized second billing event object from the local storage.

33. The method of claim 32, wherein the first and second servers are not co-located within the on-line network, and the event collecting computer centrally collects the billing event objects.

34. The method of claim 32, further comprising the step of storing the first billing event object in a first event object queue.

35. A computer-readable medium having computer-executable instructions for a method of handling a billing event in an on-line network, the steps comprising:
providing a class hierarchy of billing events wherein each defined billing event is indicative of a customer computer access to the on-line network;
generating a billing event object from the billing event class in response to the customer computer accessing a server computer in the on-line network; and
serializing and collecting the billing event object generated on said server computer in the on-line network into a storage.

36. The computer-readable medium of claim 35, wherein the class hierarchy includes a connect event.

37. The computer-readable medium of claim 35, wherein the class hierarchy includes a download event.

38. The computer-readable medium of claim 35, further comprising the step of storing the billing event object into an event object queue.

39. The computer-readable medium of claim 38, wherein collecting the billing event object into a storage includes the steps of removing the billing event object from the event object queue and serializing the billing event object.

40. A computer-readable medium having computer-executable instructions for a method of handling a billing event in an on-line network generated from a plurality of computer servers within an on-line network, the steps comprising:
providing a class hierarchy of billing events wherein each defined billing event is indicative of a customer computer access to the on-line network;
generating a first billing event object from the billing event class in response to the customer computer accessing a first server computer in the on-line network;
generating a second billing event object from the billing event class in response to the customer computer accessing a second server computer in the on-line network;

storing the second billing event object in a second event object queue, removing the second billing event object from the second event object queue, serializing the second billing event object, and storing the serialized second billing event object in a local storage in the second server computer; and collecting by an event collecting computer the first and second billing event objects generated on said first and second server computers in the on-line network into a storage, including collecting the serialized second billing event object from the local storage.

41. The computer-readable medium of claim 40, wherein the first and second servers are not co-located within the on-line network, and the event collecting computer centrally collects the billing event objects.

42. The computer-readable medium of claim 40, further comprising the step of storing the first billing event object in a first event object queue.

* * * * *

UNITED STATES PATENT AND TRADEMARK OFFICE
CERTIFICATE OF CORRECTION

PATENT NO. : 5,893,077
DATED : April 6, 1999
INVENTOR(S) : Griffin

It is certified that error appears in the above-identified patent and that said Letters Patent is hereby corrected as shown below:

ON THE TITLE PAGE

Under [56] References Cited, Other Publications, Line 4: "Minitel Service Company" should read --Minitel Services Company--.

Column 6, Line 36, "gateway" should read --gateways--.

Column 6, Line 60, "form" should read --from--.

Column 7, Line 9 of Table 1: "mn_sv" should read --m_sv--

Column 10, Line 54, "0100" should read --_0100--.

Column 10, Line 56, "VERSICN" should read --VERSION--.

UNITED STATES PATENT AND TRADEMARK OFFICE
CERTIFICATE OF CORRECTION

PATENT NO. : 5,893,077
DATED : April 6, 1999
INVENTOR(S) : Griffin

Page 2 of 2

It is certified that error appears in the above-identified patent and that said Letters Patent is hereby corrected as shown below:

Column 10, Line 63, add --}-- after "pszFileName;".

Column 10, Line 65, add --]-- after "cbFile;".

Column 11, Lines 37 and 38, add --{-- on a separate line above "CDynamic".

Column 16, Line 4 of the chart "m_cs;" should read --m_pcs;--.

Signed and Sealed this

Thirtieth Day of January, 2001

Attest:

Q. TODD DICKINSON

*Attesting Officer*       *Director of Patents and Trademarks*